(12) United States Patent
Spinella et al.

(10) Patent No.: US 11,050,356 B2
(45) Date of Patent: Jun. 29, 2021

(54) RECTIFYING CIRCUIT AND DEVICES COMPRISING THE SAME

(71) Applicant: EGGTRONIC ENGINEERING S.R.L., Modena (IT)

(72) Inventors: Igor Spinella, Modena (IT); Enrico Dente, Avigliana (IT); Giovanni Mascia, Rubiera (IT)

(73) Assignee: EGGTRONIC ENGINEERING S.R.L., Modena (IT)

( * ) Notice: Subject to any disclaimer, the term of this patent is extended or adjusted under 35 U.S.C. 154(b) by 0 days.

(21) Appl. No.: 16/769,298

(22) PCT Filed: Nov. 7, 2018

(86) PCT No.: PCT/IB2018/058734
§ 371 (c)(1),
(2) Date: Jun. 3, 2020

(87) PCT Pub. No.: WO2019/111076
PCT Pub. Date: Jun. 13, 2019

(65) Prior Publication Data
US 2020/0382018 A1    Dec. 3, 2020

(30) Foreign Application Priority Data
Dec. 4, 2017    (IT) ........................ 102017000139734

(51) Int. Cl.
*H04B 1/16*     (2006.01)
*H02M 7/217*    (2006.01)
*H02M 3/335*    (2006.01)
*H02M 7/219*    (2006.01)
*H04B 5/00*     (2006.01)

(52) U.S. Cl.
CPC ..... *H02M 7/2176* (2013.01); *H02M 3/33569* (2013.01); *H02M 7/219* (2013.01); *H04B 1/16* (2013.01); *H04B 5/0037* (2013.01)

(58) Field of Classification Search
CPC .......... H02M 1/081; H02M 1/34; H02M 1/36; H02M 1/08; H02M 1/42; H02M 1/4233; H02M 1/32; H02M 3/1588; H02M 2007/2195; H02M 7/06; H02M 7/1623;
(Continued)

(56) References Cited

U.S. PATENT DOCUMENTS 4,533,986 A     8/1985   Jones
2009/0244933 A1  10/2009  Wang et al.
(Continued)

FOREIGN PATENT DOCUMENTS

ES          1076362 U     2/2012

*Primary Examiner* — Bryan R Perez
(74) *Attorney, Agent, or Firm* — Browdy and Neimark, PLLC

(57) ABSTRACT

A rectifying circuit (10, 10.1, 10.2, 10.3, 10.4, 10.5, 10.6) comprising a first circuit branch (20) and a second circuit branch (30) in parallel between an output node (Out) and a reference node (GND), each circuit branch (20, 30) comprising an inductive element (L1, L2) in series with an electric current controlling element (23, 33) and an input node (In1, In2) arranged between the inductive element (L1, L2) and the electric current controlling element (23, 33), a voltage that is variable over time being applied between the input nodes (In1, In2) during the operation of the rectifying circuit.

33 Claims, 18 Drawing Sheets

(58) Field of Classification Search
CPC ........ H02M 7/219; H02M 7/217; H02M 7/04; H02M 7/5387
See application file for complete search history.

(56) References Cited

U.S. PATENT DOCUMENTS

| | | | |
|---|---|---|---|
| 2010/0259954 A1 | 10/2010 | Santoro et al. | |
| 2011/0170325 A1* | 7/2011 | Jungreis | H02M 7/219 363/127 |
| 2012/0224398 A1* | 9/2012 | Franco | H03K 17/302 363/21.12 |
| 2014/0084900 A1* | 3/2014 | Ramorini | H02M 3/158 323/355 |
| 2015/0333534 A1* | 11/2015 | Liu | H01L 29/7391 307/104 |

* cited by examiner

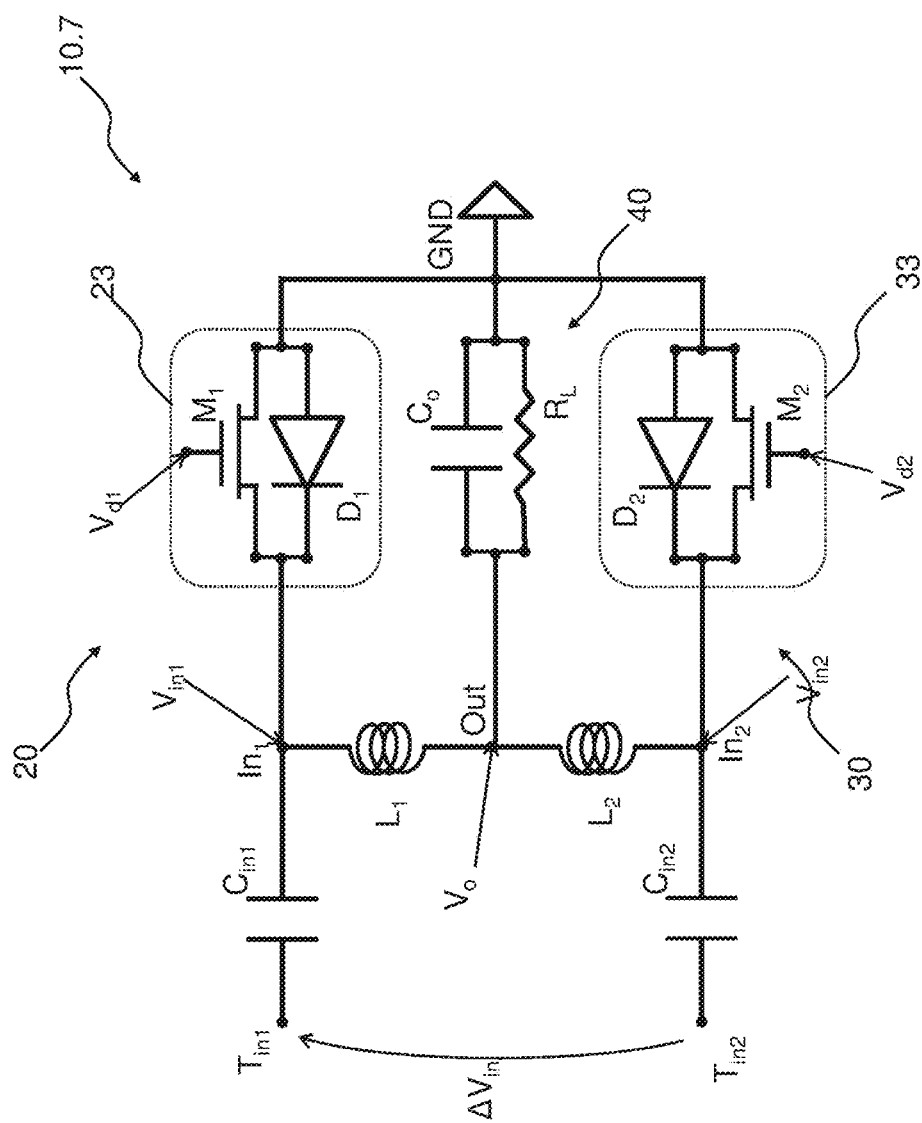

RECTIFYING CIRCUIT AND DEVICES COMPRISING THE SAME

TECHNICAL FIELD

The present invention concerns the field of electronics. More specifically, solutions in accordance with embodiments of the present invention concern a rectifying circuit, power devices and devices for wirelessly transmitting energy comprising such a rectifying circuit.

PRIOR ART

As known, the rectification of voltage waves that are variable over time, i.e. the transformation of voltage waves that are variable over time (AC) into voltages that are substantially constant over time (DC), is particularly important in most modern electronic power circuits, and in particular in AC-DC or DC-DC converters, both in insulated converters, in which the primary circuit is galvanically insulated from the secondary circuit, and in converters that are not galvanically insulated.

Over the years multiple rectifying circuits have been developed, mostly based on diodes or switches, for example MOSFET transistors or other types of transistor, useful for rectifying the voltage wave, and on low-pass filters, typically of the first or second order. Such filters are normally based on inductances and/or capacities useful for filtering as much as possible the components of the signal that are variable over time, ideally keeping only the DC component of the output voltage of the rectifier.

Examples of circuits that exploit rectifiers are for example non-insulated DC-DC circuits of the buck, boost, buck-boost type, insulated DC-DC and AC-DC circuits, for example SEPIC, flyback, LLC, and wireless energy transmission circuits, for example of the inductive or capacitive type, the latter wireless energy transmission circuits being either of the non-resonant type, or of the resonant type obtained through series resonance or through parallel resonance of circuit elements.

The simplest rectifying circuit consists of a diode, followed by a capacity in parallel to the load. This circuit is a so-called single half-wave rectifier: if for example it has to rectify a sinusoidal alternating voltage (AC), having zero average value, it is indeed capable of transmitting only the positive half-waves to the load, on the other hand remaining in cutoff state during the negative half-waves.

In order to rectify both of the half-waves of a signal having zero average value or in any case signals characterised by negative voltage for non-zero time periods, it is useful to use rectifying schemes with many diodes. One of the most used circuits, for example, is the so-called diode bridge rectifier, also called Graetz bridge, characterised by the use of four diodes, which are connected so as to operate two at a time, effectively rectifying signals having components that are variable over time, both negative and positive. On the other hand, the Graetz bridge is characterised by double losses with respect to the single diode solution, since the electric current flowing on the load must pass through two diodes in series, each of which is characterised by a loss roughly proportional to the threshold voltage of the diode multiplied by the electric current that passes through the diode itself.

If it is possible to insert a transformer in the circuit, a so-called centre-tapped solution can be adopted, in which a transformer is used that is characterised by a conventional primary winding, and by a secondary winding having a tap half way along the winding, which is connected to the secondary reference potential. The two start and end extremities of the secondary winding of the centre-tapped transformer are, on the other hand, respectively connected to the anodes of two diodes. The cathodes of such diodes are short-circuited with one another, and connected to the load to be powered and to a capacity arranged in parallel with the load in order to minimise the AC component of the output voltage, also called output ripple. A solution of this kind has a double half-wave, and at the same time has the advantage of halving the diode losses with respect to the Graetz bridge. On the other hand, the need for a centre-tapped transformer does not always allow the adoption of this rectifying scheme, since the transformer constitutes a substantial worsening of costs, weight and bulk, which are unacceptable in many types of circuits, as well as a source of losses that is substantial, in particular at high frequencies.

Both the Graetz bridge and the centre-tapped rectifier can be designed to also rectify three-phase AC power supplies and, more generally, poly-phase power supplies.

If the voltage or the output electric current must be particularly stable, it is possible to use an inductance arranged in series with the load, useful for making, together with the capacity in parallel with the load, a filter of the second order that is particularly effective in eliminating the voltage ripple applied to the load.

In designing electronic circuits and power converters, energy efficiency is one of the most important parameters. For this reason, typically, in modern rectifiers Schottky diodes are used, which are characterised by lower losses with respect to normal silicon diodes. Another approach useful for substantially reducing losses, defined as synchronous rectification, consists of using switches made with different technologies instead of the diodes, for example based on classic BJT, IGBT, MOSFET transistors, and in recent years also on MOSFET and HEMT devices made of composite materials, like SiC, GaN, AlGaN/GaN, InGaAs.

With respect to diodes, which activate and deactivate without needing control signals, synchronous rectifying schemes, in which switches like for example transistors replace the diodes, need control signals for their activation and deactivation.

The reason why this category of circuits is called synchronous is explained by the necessary synchronisation between the voltage wave to be rectified and the control signals of the switches constituting the rectifier. In other words, a synchronous rectifying circuit exploits switches, for example transistors, suitably controlled, to have behaviour close to that of an ideal diode. Typically, the synchronous rectifying circuits allow the energy losses to be substantially reduced, considerably increasing the efficiency of the rectifying circuit.

On the other hand, synchronous rectifying circuits normally have big frequency limitations; in particular for operating frequencies of the order of hundreds of kHz they operate particularly inefficiently. However, such switches are associated with circuit nodes the electric potential of which varies over time—i.e. they are so-called floating switches—and they thus need a pilot circuit capable of following the variable electric potential to ensure operation of the switch itself. For example, such pilot circuits implement bootstrap circuits, which substantially increase the circuit complexity, reduce the efficiency and limit the maximum rectification frequency of the rectifying circuit. A further drawback of this type of circuit consists of the intrinsic delay caused by an activation in cascade, for example sequential, of components of the circuit connected to one another.

Such a delay causes a discrepancy between a moment when the switch should ideally be activated or deactivated and the moment when the switch itself is actually activated or deactivated. Indeed, the real behaviour of a rectifying circuit is influenced by a so-called delay chain, comprising one or more from a delay in the detection of the moment of intervention, delays of the logic, delays of the pilot stage, and delays of the switch itself. Such delays are typically of the order of nanoseconds or even tens or hundreds of nanoseconds. These delay values make synchronous rectification substantially inefficient over a few MHz.

The limitations of modern synchronous rectification are particularly substantial since a great requirement in the field is to increase the operating frequency in order to make miniaturisation of the components of the circuit possible.

A further principle useful for reducing the losses in rectifiers, in particular at high frequency, consists of the use of suitable reactive components, typically capacities, useful for creating resonances that allow diodes and/or switches to turn on and off in low voltage conditions (ZVS) or low electric current conditions (ZCS), thus eliminating so-called "hard switching", i.e. the transitions from on to off and vice-versa in conditions of simultaneous presence of high voltage and high electric current, which are typically harmful to the efficiency of the system. This type of rectifier, like any resonant circuit, typically have the drawback of operating effectively only around an optimal frequency, drastically reducing its efficiency if the signal to be rectified differs from the optimal frequency.

A purpose of the present invention is to overcome the aforementioned drawbacks of the prior art, in a simple, rational and low-cost solution.

In detail, a purpose of the present invention is to provide a rectifying circuit, according to one or more circuit arrangements, suitable for operating efficiently also at high frequencies, for example of the order of KHz or more like MHz and GHz.

A further purpose of the present invention is to provide a synchronous rectifying circuit, according to one or more circuit arrangements, not affected by limitations caused by parasitic elements intrinsic to electronic components comprised in the rectifying circuit; in particular, not affected by the activation of parasitic diodes intrinsic to transistors used as switches.

Another purpose of the present invention is to provide a rectifying circuit capable of selectively adjusting the rectified voltage; in particular, a rectifying circuit with function as reducer, increaser, reducer/increaser and/or voltage inverter.

Such purposes are accomplished by the characteristics of the invention given in the independent claim. The dependent claims outline preferred and/or particularly advantageous aspects of the invention.

SUMMARY OF THE INVENTION

The invention provides a rectifying circuit comprising a first circuit branch and a second circuit branch in parallel between an output node and a reference node, each circuit branch comprising an inductive element in series with an electric current controlling element and an input node arranged between the inductive element and the electric current controlling element, an input voltage that is variable over time being applied between the input nodes during the operation of the rectifying circuit.

Thanks to such a solution, the rectifying circuit has an extremely compact structure and, at the same time, is capable of converting an input signal efficiently.

In an embodiment of the rectifying circuit, in each circuit branch the inductive element is arranged between the output node and the input node, whereas the current controlling element is arranged between the reference node and the input node.

In an alternative embodiment, in each circuit branch the electric current controlling element is arranged between the output node and the input node, whereas the inductor is arranged between the reference node and the input node.

In an embodiment of the rectifying circuit, each electric current controlling element comprises a diode, the anode of the diode being connected to the reference node and the cathode of the diode being connected to the respective input node. Preferably, the inductive element is connected to the respective input node and to the output node.

In an embodiment, each electric current controlling element comprises a diode, the anode of the diode being connected to the respective input node and the cathode of the diode being connected to the output node. Preferably, the inductive element is connected to the respective input node and to the reference node.

Thanks to the use of the diodes, an extremely simple and effective rectifying circuit is obtained.

In an embodiment, each electric current controlling element comprises a transistor. Preferably, the transistor comprises a first conduction terminal connected to the reference node and a second conduction terminal connected to the respective input node.

Thanks to such a solution, a rectifying circuit is obtained having high performance and less losses.

In an embodiment, each electric current controlling element comprises a transistor and a diode, the transistor being connected in parallel to the diode.

In this way, a current controlling element is obtained that is capable of reacting to a variable voltage on the respective input node in an optimal manner.

In an embodiment, each transistor is selected from a silicon field-effect transistor, preferably of type n or alternatively of type p, a field-effect transistor made up of elements of group III and V, preferably with high electron mobility HEMT, for example InGaAs, GaAs, AlGaAs, or GaN, a field-effect transistor made up of elements of group IV, preferably SiC, a bipolar transistor, an insulated-gate bipolar transistor, or IGBT.

In an embodiment, each transistor is a field-effect transistor, a source terminal of the field-effect transistor being connected to the reference node and a drain terminal of the field-effect transistor being connected to the respective input node.

In this way, it is possible to control the transistors in a simple manner without the need for specific bootstrap circuits, since the source terminals of the transistors are referred to a constant potential, for example to the reference potential.

In an embodiment, each electric current controlling element comprises a further transistor. Preferably, the further transistor is connected in anti-series to the respective transistor.

In this way, a current controlling element is obtained that is suitable for operating substantially in a way corresponding to a current controlling element comprising an ideal switch without implementing any diode inside the circuit.

In this way, a current controlling element is obtained that is suitable for actively controlling an electric current flowing in both possible directions and, at the same time, carrying out a selective rectification. This makes it possible, in particular, to carry out 'skips' in the rectification cycles, or to carry out partial rectifications of the straightening cycle, of an electric signal, i.e. the input voltage, applied to the input node, or to arbitrarily decide the sign of the output voltage by intervening only on the control strategy. In other words, such a current controlling element makes it possible to obtain a constant output voltage with an equal or lower value, and selectable sign, than the desired input voltage.

In an embodiment, an output branch is connected to the output node and to the reference node. Preferably, the output branch comprises a capacitive element and a load element coupled in parallel. Even more preferably, the load element and the capacitive element are coupled between the output node and the reference node of the rectifying circuit.

In an embodiment, the rectifying circuit further provides for a further current controlling element, preferably comprising a transistor. The further current controlling element is advantageously connected in series to the capacitive element and to the load element in parallel with each other. The series of the transistor and of the parallel between capacitive element and load element is connected between the output node and the reference node of the rectifying circuit.

In this way, a current controlling element is obtained that is suitable for actively controlling an electric current flowing in both possible directions and, at the same time, carrying out a selective rectification. This makes it possible, in particular, to carry out 'skips' in the rectification cycles of an electric signal, i.e. the input voltage, applied to the input node. In other words, such a current controlling element makes it possible to obtain a constant output voltage with a value equal to or less than the desired input voltage.

In an alternative embodiment, a plurality of output branches is connected to the output node and to the reference node. Preferably, each output branch comprises a current controlling element, for example a transistor, in series with the load element and with the capacitive element to selectively connect the latter to the remaining rectifying circuit. Thanks to such a solution the rectifying circuit can effectively dispense electrical energy to many loads connected to it, in a substantially independent manner between the output branches.

In an embodiment, the rectifying circuit further comprises a capacitive element connected to the input nodes of the circuit branches. In an alternative embodiment, the capacitive element is replaced by two capacitive elements, each arranged in parallel with a respective current controlling element.

In this way, it is possible to obtain a high maximum output voltage and, at the same time, avoid hard switching conditions in each current controlling element. Advantageously, the capacitive element is sized to allow the diodes and the transistors to be switched on and/or off in a soft switching condition of the Zero Voltage Switching or Zero Current Switching type, in order to minimise operating losses.

In an embodiment, the capacitive element is sized to define a predetermined resonance frequency in combination with the inductive elements.

In this way, a resonant rectifying circuit is obtained without the need for additional reactive elements.

In an embodiment, the rectifying circuit further comprises a pair of input terminals for receiving the input voltage.

Preferably, the rectifying circuit further comprises at least one decoupling element, for example capacitive, connected to the input node and to a respective input terminal. Even more preferably, each circuit branch further comprises a decoupling element connected to the input node and to a respective input terminal.

In this way, both by providing a single decoupling element and a pair of decoupling elements, it is possible to insulate the rectifying circuit from direct currents in circuits coupled with the input terminals.

In an embodiment, each decoupling element provided in the rectifying circuit comprises a respective reactive element, for example capacitive. Preferably, the single capacitive element or the pair of capacitive elements are sized to define a predetermined resonance frequency in combination with the inductive elements of the rectifying circuit.

Thanks to such a solution a resonant rectifying circuit is obtained, capable of raising the output voltage with respect to the input voltage and at the same time galvanically insulating the load from the input voltage.

In an embodiment, further reactive elements are provided in series with the decoupling elements, so as to form a resonator or tank LC. In this way, it is possible to adjust the resonance frequency independently from the decoupling of the direct currents, making a circuit having the double function of voltage-increaser and rectifier, particularly useful in circuits characterised by low input voltages.

In an alternative embodiment, the rectifying circuit comprises a single circuit branch. In this way, an extremely compact circuit is obtained.

In an embodiment, the rectifying circuit further comprises a control module.

Moreover, each transistor further comprises a control terminal connected to the control module to receive a respective pilot signal.

Preferably, the control module is configured to generate a pilot signal suitable for activating the transistors so as to supply the output node with voltage and/or current values (with respect to the reference node): greater than the voltage and/or current values applied in input; lower than the voltage and/or current values applied in input, of different sign with respect to voltage and/or current applied in input.

Preferably, the control module comprises: a measuring unit suitable for measuring at least one value from electric voltage and current at at least one from a node of the circuit and an element of the rectifying circuit, and a pilot unit suitable for generating a pilot signal based on at least one value measured for each transistor and supplying the pilot signal to the control terminal of the respective transistor.

In this way, it is possible to implement a control of the rectifying circuit in a simple and effective manner.

In an embodiment, the measuring unit is configured to measure at least one from: a voltage at the input node of the first circuit branch; an electric current flowing through the electric current controlling element of the first circuit branch; a power absorbed by the electric current controlling element of the first circuit branch; a voltage at the input node of the second circuit branch; an electric current flowing through the electric current controlling element of the second circuit branch; a power absorbed by the electric current controlling element of the second circuit branch, or a voltage at the output node of the rectifying circuit.

In an embodiment, the measuring unit is configured to measure at least one from: an electric current flowing through the load element; an electric current flowing through the capacitive element positioned in parallel to the load, and a power absorbed by the load element.

In an embodiment, the control module further comprises a powering unit connected to the output node, to the pilot unit and to the measuring unit.

Preferably, the powering unit absorbs energy from the output node and supplies it to the pilot unit and to the measuring unit for the operation thereof.

Advantageously, the powering unit converts the voltage of the output node into one or more suitable power supply voltages suitable for ensuring the correct operation of the pilot unit and of the measuring unit.

In this way, the rectifying circuit is capable of powering itself.

In an embodiment, the powering unit comprises a low-dropout regulator, possibly an LDO regulator, advantageously configured to lower and stabilise the output voltage in a particularly efficient manner to obtain the one or more power supply voltages of the pilot unit and of the measuring unit.

Thanks to such a solution, the rectifying circuit can power itself in a particularly efficient manner.

In an alternative and preferable embodiment, the powering unit is connected to at least one of the two input nodes. Preferably, a rectifying element is inserted in series between the powering unit and the input node. Even more preferably, the rectifying element comprises a diode and a filter, for example a diode in series with the powering unit and a capacity arranged in parallel to the same with respect to the reference terminal.

In this embodiment, the powering unit and therefore the control unit are activated independently from the output voltage of the rectifying circuit.

Thanks to such a solution, the circuit is particularly efficient during start-up.

Moreover, the rectifying circuit comprises current controlling elements free from diodes, and such a solution ensures that the control module is correctly powered also in an initial step of the operation of the circuit in which the voltage at the output node has not yet stabilised within normal operating values and, therefore, it would not be possible to control the current controlling elements in the case in which the powering unit is connected to the output node.

In an embodiment, the pilot unit comprises: a delay estimation block suitable for estimating at least one delay associated with a switching of the pilot signal supplied to the respective transistor and a corresponding response of the rectifying circuit based on at least one measured value. Preferably, the pilot unit also comprises a logic block suitable for generating the pilot signal for each transistor based on the delay identified.

In this way, it is possible to achieve a substantially ideal operation of the circuit, dynamically compensating for the delays of each element of the circuit.

In an embodiment, the pilot block is suitable for generating the pilot signal for each transistor based on at least one measured value and the identified delay.

In this way, it is possible to generate optimised pilot signals for the delays of each element of the circuit and for the current operating conditions of the rectifying circuit.

In an embodiment, the delay estimation block is configured to estimate an activation delay associated with a first switching of the pilot signal, suitable for activating the respective transistor, and the corresponding response of the circuit to it.

In this way the delay of successful switching on of the transistors with respect to the moment of sending the pilot signal is determined with precision.

In an embodiment, the delay estimation block is configured to estimate a switching-off delay associated with a second switching of the pilot signal, suitable for switching the respective transistor off, and the corresponding response of the rectifying circuit to it.

In this way the delay of successful switching off of the transistors with respect to the moment of sending the pilot signal is determined with precision.

In an embodiment, the logic block is configured to generate at least one first predetermined test pilot signal and a second predetermined test pilot signal and supply them to the transistor of the first circuit branch and to the transistor of the second circuit branch, respectively. Preferably, the delay estimation block is configured to estimate a delay in the response of the rectifying circuit to the test pilot signals.

In this way it is possible to quickly determine an optimal progression of the pilot signals.

In an embodiment, the logic block is configured to generate the test pilot signals upon an activation of the control module.

In this way it is possible to determine the optimal progression of the pilot signals as soon as the rectifying circuit starts operating.

In an embodiment, the logic block is configured to generate the pilot signals earlier so as to compensate for the delay identified by the delay estimation block.

In this way a highly accurate control of the operation of the rectifying circuit is obtained.

In an alternative embodiment, the logic block is configured to generate the pilot signals earlier with respect to the ideal pilot signal identified by a predetermined value.

Thanks to such a solution it is possible to provide a compensation of the initial delays in an extremely simple manner.

In an embodiment, the logic block is configured to compensate for the delay so as to minimise the voltage between the terminals of each current controlling element at least when the input voltage at the respective input node is less than the reference voltage. In this way, the consumption of energy of the rectifying circuit is reduced and optimal switching of the current controlling element is ensured.

In an embodiment, the logic block is configured to compensate for the delay so as to minimise the electric current flowing through each current controlling element at least when the input voltage applied to the terminal of the controller element is greater than the reference voltage.

In this way an energy consumption of the rectifying circuit is reduced and an optimal switching of the current controlling element is ensured.

In an embodiment, the logic block is configured to compensate for the delay so as to minimise a power dissipated by each electric current controlling element.

In this way a better efficiency of the rectifying circuit is obtained.

In an embodiment, the logic block is configured to compensate for the delay so as to maximise the power absorbed by the load element.

In this way a better efficiency of the rectifying circuit is obtained.

In an embodiment, the input voltage is a voltage that is variable over time comprising opposite and periodically alternate half-waves. Preferably, each circuit branch is suitable for converting a respective half-wave of the input voltage into a direct output voltage. Even more preferably, the pilot unit is configured to generate the pilot signal for each transistor so as to selectively inhibit the conversion of the respective half-wave of the input voltage.

Thanks to such a solution it is possible to implement functions of a voltage lowering circuit in the rectifying circuit without requiring structural modifications thereto.

In one embodiment, each inductive element may consist of an inductor, i.e. an electrical component that generates a magnetic field upon the passage of electric current, and preferably from a magnetically insulated inductor, i.e. an inductor that is not magnetically coupled to any other inductors.

In this way, the inductive elements of this embodiment of the present invention are different, for example, from the windings (coils) of a transformer, in which, vice versa, the primary and secondary windings are always magnetically coupled to each other.

A further aspect of the invention provides a power device comprising such a rectifying circuit. Examples of such power devices comprise non-insulated DC-DC circuits of the buck, boost, buck-boost type, insulated DC-DC and AC-DC circuits, for example SEPIC, flyback, LLC, etc.

A further aspect of the invention provides an inductive receiver circuit comprising such a rectifying circuit. Preferably, each inductive element comprises a respective receiving coil.

In an embodiment, the coils overlap one another.

In this way a compact structure is obtained and the coils are crossed uniformly by a magnetic field.

A further aspect of the invention provides a capacitive receiver circuit comprising such a rectifying circuit. Preferably, each of the input nodes is coupled with a respective receiving plate.

A further aspect of the invention provides a radio frequency receiver circuit comprising such a rectifying circuit. Preferably, at least one of the input nodes is coupled with an antenna.

In an embodiment, the radio frequency receiver circuit comprises at least one additional circuit branch coupled with a respective antenna, each branch comprising a respective inductor and condenser pair resonating at a respective frequency.

Thanks to such a solution it is possible to make a radio frequency receiver circuit having an array of antennae with an extremely simple modular structure.

BRIEF DESCRIPTION OF THE DRAWINGS

Further characteristics and advantages of the invention will become clear from reading the following description provided as an example and not for limiting purposes, with the help of the figures illustrated in the attached tables.

FIGS. 1, 2, 3, 4, 5, 6, 7A, 7B, 8A, 8B and 9 are concept circuit diagrams of respective rectifying circuits according to embodiments of the present invention.

BEST EMBODIMENT OF THE INVENTION

Figure 1:
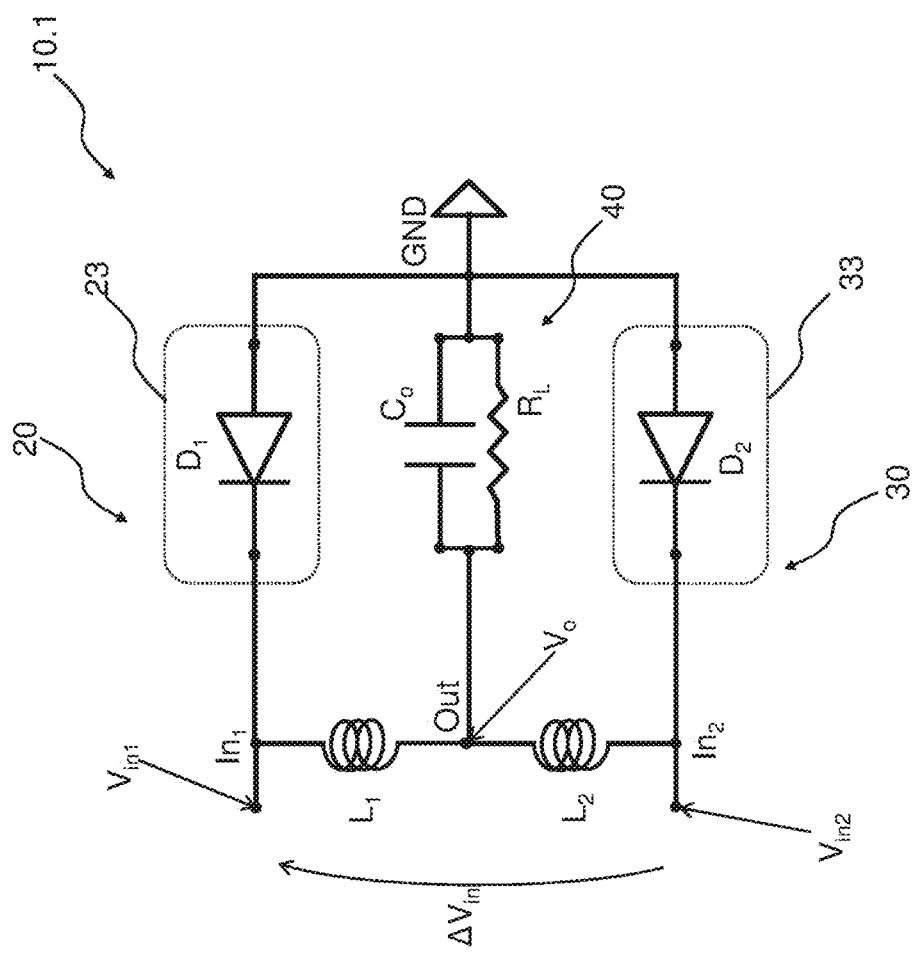

With particular reference to such figures, a rectifying circuit according to the present invention has been globally indicated with 10, whereas reference numerals 10.1, 10.2, 10.3, 10.4, 10.5, 10.6, 10.7, 10.7', 10.8, 10.8', 10.9 indicate specific embodiments of the rectifying circuit according to the present invention described hereinafter.

In general, the rectifying circuit 10 in accordance with embodiments of the present invention comprises a first circuit branch 20 and a second circuit branch 30 in parallel between an output node Out and a reference node GND, for example a ground node of the circuit. Each circuit branch 20 and 30 comprises an inductive element, for example an inductor L1 and L2, respectively, and an electric current controlling element 23 and 33, respectively. The inductive element L1 and L2 is in series with the respective electric current controlling element 23 and 33. A corresponding input node In1 and In2 is defined between the inductive element L1 and L2 and the electric current controlling element 23 and 33. During the operation of the rectifying circuit 10, between the input nodes In1 and In2 an input voltage ΔVin is applied; in particular, the input voltage comprises at least one component that is variable over time.

Advantageously, the inductive elements L1 and L2 can be optimised to work efficiently up to high frequencies, in particular of the order of hundreds of kHz, of MHz, of tens or hundreds of MHz, of GHz or even of tens of GHz.

Moreover, the rectifying circuit according to the present invention has substantially halved losses with respect to circuit solutions based on Graetz bridges.

In parallel with the circuit branches 20 and 30, i.e. between the output node Out and the reference node GND a load branch 40 is typically connected. The load branch 40 comprises a load impedance, in particular a load resistance Rl in the non-limiting examples considered here. In a preferred embodiment, the load branch 40 also comprises a capacitive element, for example a condenser Co. Even more preferably, the load resistance Rl and the condenser Co are arranged in parallel with one another, i.e. both the load resistance Rl and the condenser Co are connected to the output node Out and to the reference node GND. Of course, the load impedance can comprise different components in addition, or as an alternative, to the load resistance, like inductive and/or reactive components.

It should be observed that in the present document, when it is indicated that a component equipped with a pair of terminals, like condensers, inductors, resistors, diodes, etc., is connected to two different circuit nodes, this means that a respective terminal of such a component is connected to a corresponding one of said circuit nodes.

In the rectifying circuit 10.1 (illustrated in FIG. 1) according to a first embodiment, each of the inductors L1 and L2 is connected to the output node Out and to the respective input node In1 and In2, whereas each electric current controlling element 23 and 33 is connected to the reference node GND and to the respective input node In1 and In2. Each of the electric current controlling elements 23 and 33 comprises a respective diode D1 and D2. In detail, the anode of each diode D1 and D2 is connected to the reference node GND, whereas the cathode of each diode D1 and D2 is connected to the respective input node In1 and In2.

Figure 2:
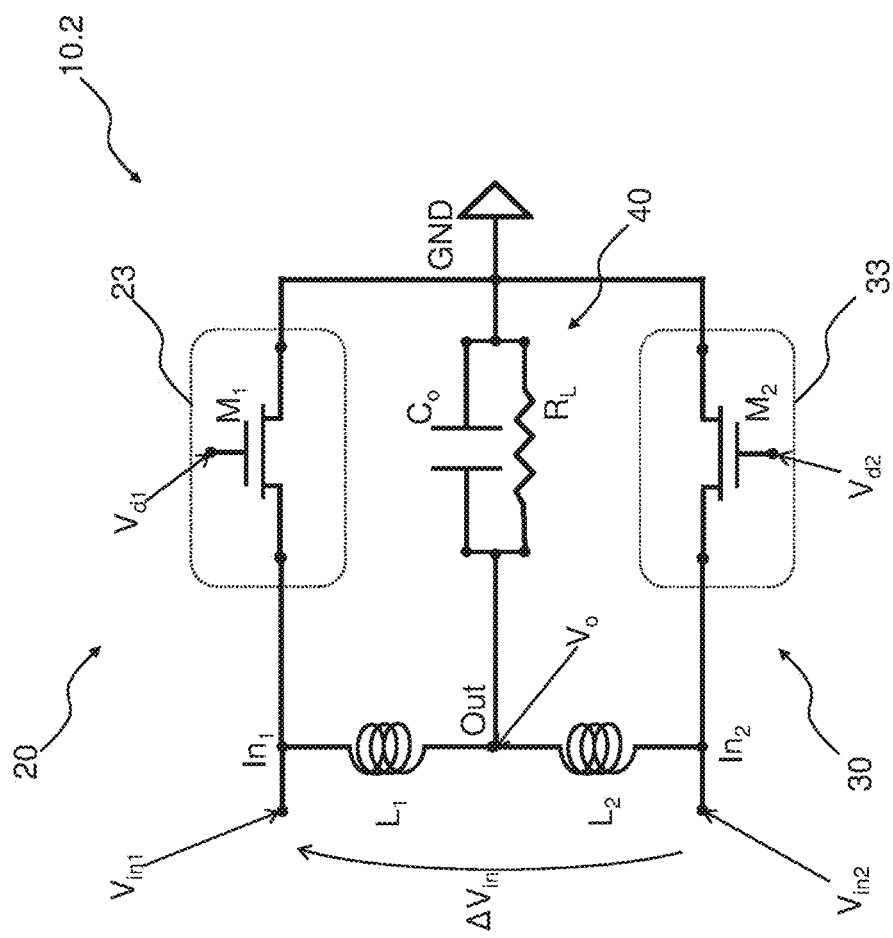

In the rectifying circuit 10.2 (illustrated in FIG. 2) in accordance with a second embodiment, each of the inductors L1 and L2 is connected to the output node Out and to the respective input node In1 and In2, whereas each electric current controlling element 23 and 33 is connected to the reference node GND and to the respective input node In1 and In2. Each of the electric current controlling elements 23 and 33 comprises a respective switch, preferably transistors M1 and M2. In detail, each transistor M1 and M2 comprises a first conduction terminal connected to the reference node GND and a second conduction terminal connected to the respective input node In1 and In2. In addition, each transistor M1 and M2 comprises a control terminal coupled with a control module 50 (shown in FIGS. 10A and 10B) for receiving a respective pilot signal Vd1 and Vd2 (as described hereinafter).

Preferably, the transistors M1 and M2 are of mutually corresponding type. Even more preferably each transistor M1 and M2 is selected from a silicon field-effect transistor preferably of type n or, alternatively, of type p, a field-effect transistor, preferably of the high electron mobility type or HEMT made up of elements of group III and V for example composite materials such as InGaAs, GaAs, AlGaAs, or GaN, a transistor, preferably a field-effect transistor, made up of elements of group IV, for example made of composite material such as silicon carbide SiC, a bipolar transistor, a bipolar transistor with insulated control terminal, or Insulated Gate Bipolar Transistor—IGBT.

Advantageously, in the case in which the transistors M1 and M2 are field-effect transistor, in particular Metal Oxide Semiconductor Field-effect transistor—MOSFET, or HEMT, a source terminal of the transistor M1 and M2 is preferably connected to the reference node GND and a drain terminal of the transistor M1 and M2 is connected to the respective input node In1 and In2. Thanks to such a solution, the transistors M1 and M2 are referred to the reference potential of the rectifying circuit 10.2 of the reference node GND, and therefore they do not need a bootstrap circuit, or procedure, reducing the circuit complexity and simplifying the control thereof, even at high frequency.

However, there is no reason why an alternative rectifying circuit (not illustrated) cannot be provided, wherein in each circuit branch the respective transistor is arranged between the output node and the input node, whereas the inductor is arranged between the input node and the reference node.

Figure 3:
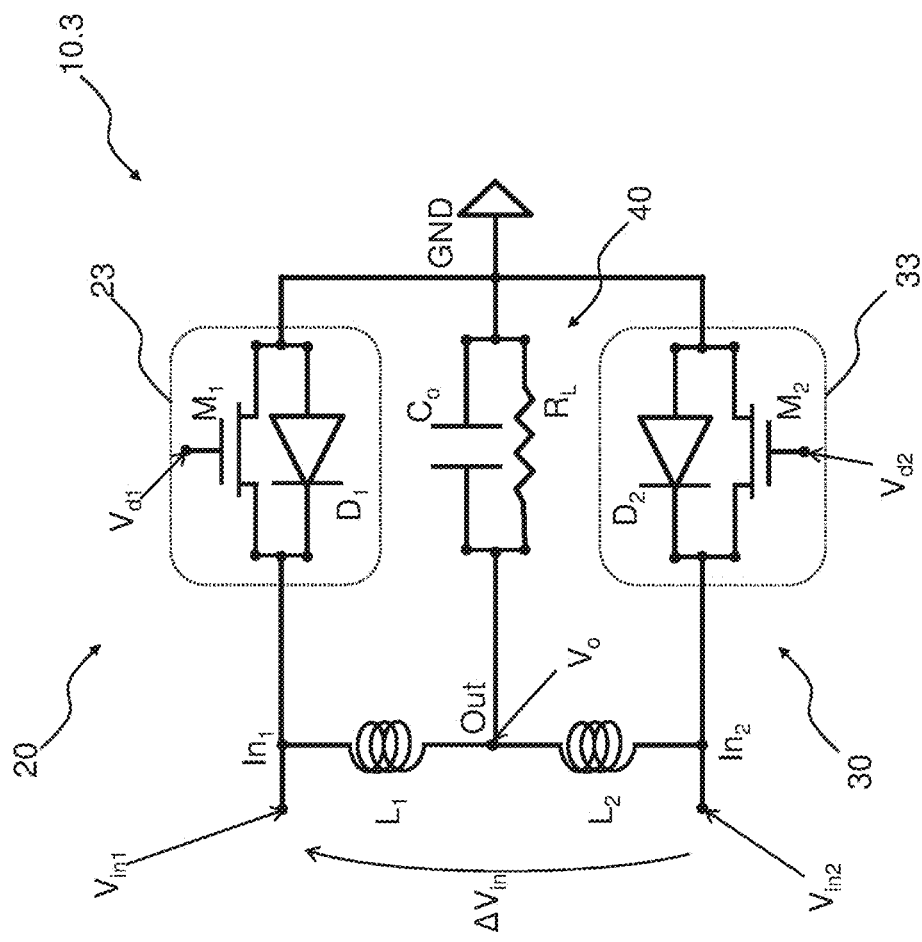

In the rectifying circuit 10.3 (illustrated in FIG. 3) according to a third embodiment, each of the inductors L1 and L2 is connected to the output node Out and to the respective input node In1 and In2, whereas each electric current controlling element 23 and 33 is connected to the reference node GND and to the respective input node In1 and In2. Each of the electric current controlling elements 23 and 33 comprises a respective diode D1 and D2 and a respective transistor M1 and M2. In detail, each transistor M1 and M2 comprises a first conduction terminal connected to the reference node GND and a second conduction terminal connected to the respective input node In1 and In2. In addition, each transistor M1 and M2 comprises a control terminal coupled with a control module 50 to receive a respective pilot signal Vd1 and Vd2 (as described hereinafter). Moreover, the anode of each diode D1 and D2 is connected to the reference node GND, whereas the cathode of each diode D1 and D2 is connected to the respective input node In1 and In2. In other words, each transistor M1 and M2 is connected in parallel to the corresponding diode D1 and D2.

This structure of the electric current controlling elements 23 and 33 has the purpose of promoting a synchronous rectification of the waveform of the input voltage ΔVin and at the same time of allowing the starting of the system and therefore the starting of the rectification also in the initial moments, when the transistors M1 and M2 may not be controlled by the control module 50 (which can be inactive during such initial moments).

Figure 4:
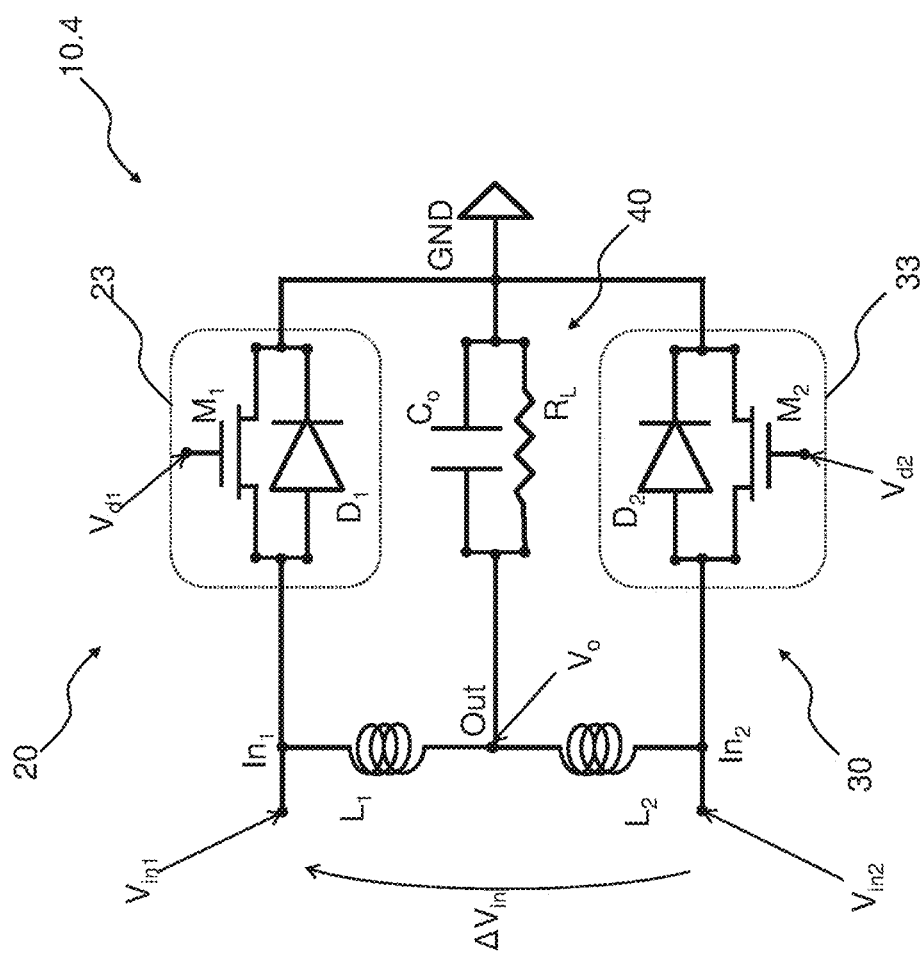

The rectifying circuit 10.4 (illustrated in FIG. 4) in accordance with a third embodiment differs from the rectifying circuit 10.3 by the arrangement of the diodes D1 and D2 included in the electric current controlling elements 23 and 33. In particular, the diodes D1 and D2 have the respective anodes connected to the input node In1 or In2 of the corresponding circuit branch 20 or 30. Differently, the cathodes of the diodes D1 and D2 are both connected to the reference terminal GND.

The structure of the rectifying circuit 10.4 and, in particular of the current controlling elements 23 and 33, makes it possible to supply an output voltage Vout of negative value.

In an alternative embodiment of the rectifying circuit (not illustrated) each of the inductors L1 and L2 is connected to the reference node GND and to the respective input node In1 and In2, whereas each electric current controlling element 23 and 33 is connected to the output node Out and to the respective input node In1 and In2. Each of the electric current controlling elements 23 and 33 comprises a respective diode D1 and D2 and a respective transistor M1 and M2. In detail, each transistor M1 and M2 comprises a first conduction terminal connected to the output node Out and a second conduction terminal connected to the respective input node In1 and In2. In addition, each transistor M1 and M2 comprises a control terminal coupled with a control module 50 to receive a respective pilot signal Vd1 and Vd2 (as described hereinafter). Moreover, the cathode of each diode D1 and D2 is connected to the output node Out, whereas the anode of each diode D1 and D2 is connected to the respective input node In1 and In2. In other words, each transistor M1 and M2 is connected in parallel to the corresponding diode D1 and D2.

Figure 5:
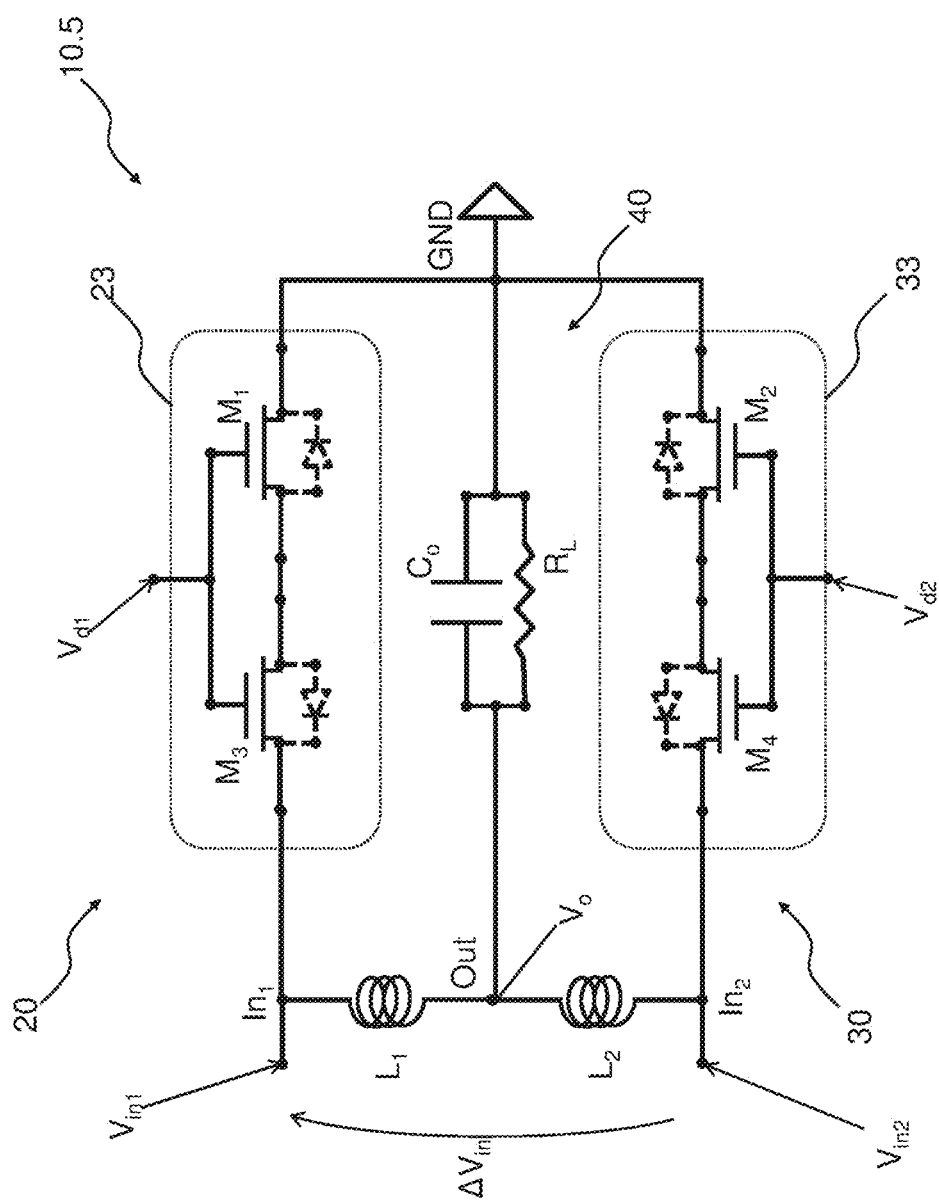

In the rectifying circuit 10.5 (illustrated in FIG. 5), each current controlling element 23 and 33 comprises, as well as the transistor M1 or M2, a further transistor M3 or M4, respectively. In particular, each current controlling element 23 and 33 comprising the transistors M1 and M3, and M2 and M4 are connected in counter-series. In other words, the transistors M1 and M3 are connected to one another through the respective source terminals, whereas the drain terminal of the transistor M1 is connected to the reference node GND and the drain terminal of M3 is connected to the input node In1.

Similarly, the transistors M2 and M4 are connected to one another through the respective source terminals, whereas the drain terminal of the transistor M2 is connected to the reference node GND and the drain terminal of M4 is connected to the input node In2. Preferably, the transistors M1 and M3 are controlled by the same pilot signal Vd1. Similarly, the transistors M2 and M4 are controlled by the same pilot signal Vd2

In this way, the parasitic diodes of the transistors M1-M4 (in a broken line in FIG. 5), are in counter-series, i.e. they mirror one another in pairs. In the example considered, the parasitic diode of the transistor M1 mirrors the parasitic diode of the transistor M3 (and vice-versa) and the parasitic diode of the transistor M2 mirrors the parasitic diode of the transistor M4.

Consequently, such parasitic diodes cannot enter into spontaneous conduction. Thanks to such a solution, at the expense of two additional transistors arranged in series with each other—and therefore crossed by an electric current that powers the load, it is possible to obtain current controlling elements 23 and 33 with a behaviour totally analogous to the behaviour of ideal switches.

In particular, in the rectifying circuit 10.5 where the diodes D1 and D2 are omitted, it is possible to selectively or partially rectify the input voltage ΔVin. In this way, as well as providing a highly efficient synchronous rectification, the rectifying circuit 10.5 makes it possible to selectively adapt, in particular lower, a value of the output voltage Vout on the node Out by suitably controlling the transistors comprised in the current controllers 23 and 33. In other words, the rectifying circuit 10.5 provides both a voltage rectification function and a function of adjustment, in particular of lowering, of the voltage supplied to the load, a function typically implemented through two separate stages, and in particular one rectification stage and one voltage reduction stage, which are distinct from one another.

Moreover, the rectifying circuit 10.5 can also selectively operate as voltage inverter by imposing a phase shift of 180 degrees to pilot signals Vd1 and Vd2 supplied to the transistors comprised in the current controllers 23 and 33. In other words, as a function of the phase of the pilot signals with respect to the output voltage, the rectifying circuit 10.5 can also be controlled to supply the output voltage Vout on the output node Out with negative value with respect to the reference voltage GND. Also in this case, the rectifying circuit 10.5 makes it possible to adjust the output voltage Vout between a minimum negative value and the reference value GND (for example 0 V) with suitable control, for example such as to selectively rectify the waves of input voltage ΔVin.

The rectifying circuit 10.5, according to embodiments of the present invention, therefore makes it possible to adjust the output voltage Vout at the node Out, in a dynamic and totally reconfigurable manner by acting exclusively on the pilot signals Vd1 and Vd2, selecting any one from a minimum negative value and a maximum positive value. For example, the minimum can correspond to a maximum or peak value of the input voltage ΔVin, i.e. $|\Delta Vin_{MAX}|$, or of a multiple thereof with changed sign, i.e.—$n \cdot |\Delta Vin_{MAX}|$, where n is a positive number, whereas the maximum value can correspond to the maximum value of the input voltage ΔVin, i.e. $|\Delta Vin_{MAX}|$ or of a multiple thereof, i.e. $n \cdot |\Delta Vin_{MAX}|$). In order to obtain a maximum value of voltage $n \cdot |\Delta Vin_{MAX}|$ greater in absolute value than the peak value of the input voltage ΔVin it is possible to use a resonance, as illustrated in the relative next paragraph. The voltage can be suitably adjusted by acting on the number of rectification cycles skipped, or alternatively on the percentage rectification of each cycle.

It will be clear that corresponding advantages can be obtained in an alternative rectifying circuit (not illustrated) where the orientation of the transistors in anti-series is inverted, i.e. inverting drain and source respectively of the transistors M1 and M3 and of the transistors M2 and M4.

Figure 6:
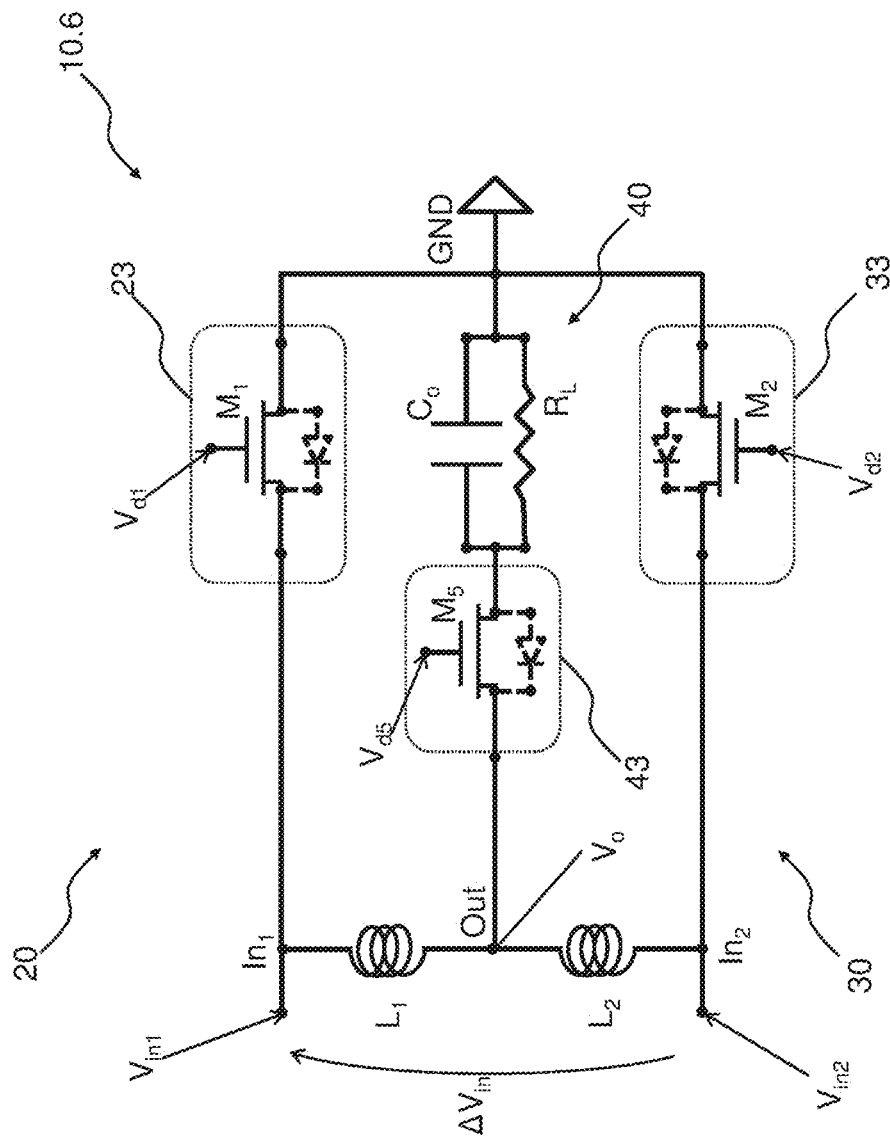

In an alternative embodiment (shown in FIG. 6), the rectifying circuit 10.6 comprises an additional current controlling element 43 arranged in series with the load branch 40. For example, the additional current controlling element 43 can be connected to the output node Out and to the load branch 40. Alternatively, the additional current controlling element 43 can be connected to the reference node and to the load branch 40.

Preferably, the additional current controlling element 43 comprises a transistor M5 of analogous type to the transistors M1 and M2. In particular, the transistor M5 is arranged so that the respective parasitic diode (in broken line in FIG. 5) is in counter-series with respect to the parasitic diodes of M1 and M2.

In this way, analogous advantages to what has been outlined above are obtained in relation to the rectifying circuit 10.5, but with the single additional transistor and therefore with lower cost, both in terms of necessary resources and in economic terms.

Moreover, the rectifying circuit 10 according to embodiments of the present invention can comprise one or more additional elements. Hereinafter alternative embodiments of the rectifying circuit 10.3 according to the third embodiment described above comprising one or more additional elements are illustrated. However, it will be clear to those skilled in the art that analogous alternative embodiments based on the rectifying circuits 10.1, 10.2, 10.4, 10.5 and 10.6 described above are possible.

Figure 7B:
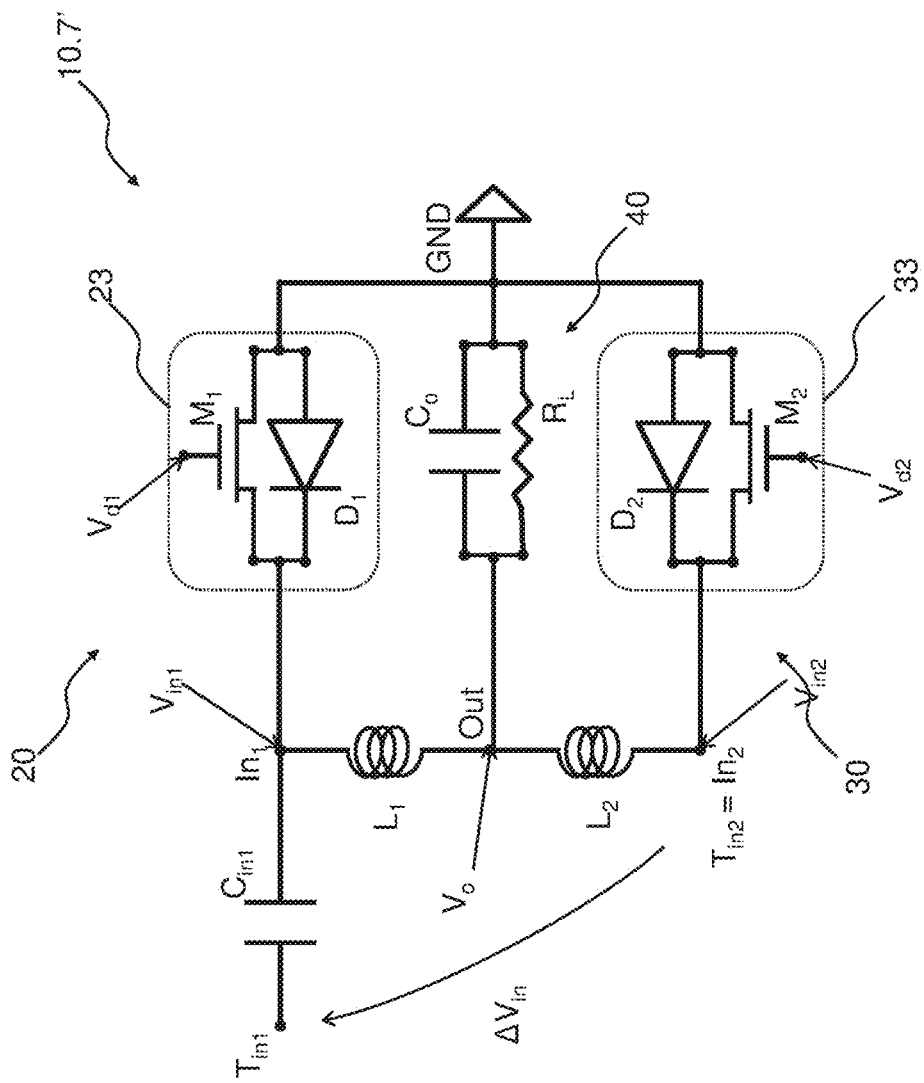

In a first alternative embodiment (illustrated in FIG. 7A), the rectifying circuit 10.7 differs from the rectifying circuit 10.3 in that at least one from the circuit branch 23 and 33 comprises a respective decoupling element, for example a capacitive element, preferably an input condenser Cin1 and Cin2, suitable for decoupling the rectifying circuit 10.7 from a circuitry coupled with the same to supply the input voltage ΔVin. In detail, the rectifying circuit 10.7 comprises a pair of input terminals Tin1 and Tin2 to receive the input voltage ΔVin supplied by a circuitry connected to such terminals Tin1 and Tin2. Each input condenser Cin1 and Cin2 is connected to the input node In1 and In2 of the corresponding circuit branch 23 and 33, and to a respective input terminal Tin1 and Tin2.

In this way, it is possible to prevent electrical polarisation currents and voltages, i.e. direct, of the circuitry connected to the terminals Tin1 and Tin2 from influencing the rectifying circuit 10.7. In particular, the condensers Cin1 and Cin2 in series with the input nodes In1 and In2 ensure that there are no harmful and undesired components in direct electric current, or DC, on the inductors L1 and L2. Indeed, the inductors L1 and L2 operate as short-circuits for the direct component of an electric current that passes through the terminals Tin1 and Tin2 potentially determining malfunctioning of the rectifying circuit 10.3 (i.e. a circuit without Cin1 and Cin2) due to a flow of direct electric current that passes through the inductors L1 and L2.

In an alternative embodiment (illustrated in FIG. 7B) a rectifying circuit 10.7' is provided comprising only one from the condensers Cin1 and Cin2. Indeed, the blocking of the direct current can be ensured through only one of the condensers Cin1 and Cin2. However, the provision of both of the condensers Cin1 and Cin2 makes it possible to galvanically insulate the load branch 40, in particular the load resistance Rl, from a generator circuit connected to the input terminals T1 and T2, without needing expensive, bulky and inefficient transformers.

Advantageously, the input condensers Cin1 and Cin2 can be sized to define a predetermined first resonance frequency fr1 in combination with the inductors L1 and L2. In other words, the input condensers Cin1 and Cin2, and the inductors L1 and L2 form a resonant tank LC.

Thanks to the correct sizing of the resonant tank consisting of the condensers Cin1, Cin2, and the inductors L1 and L2, it is possible to raise the output voltage Vout with respect to the input voltage ΔVin, making a circuit having the double function of voltage increaser and rectifier, particularly useful in circuits characterised by low input voltages, as often occurs in wireless energy transmitters or in powering systems based on energy harvesting.

It should be observed that in the case of the circuit 10.5, the combination of input condensers Cin1 and Cin2 sized to be resonant with the inductors L1 and L2 at a predetermined resonance frequency with the architecture of the current controllers 23 and 33 comprising transistors in anti-series, makes it possible to dynamically vary the output voltage Vout, i.e. the voltage applied to the load resistance Rl between a minimum negative value and a maximum positive value can also be greater in absolute value than the peak voltage of the input voltage ΔVin, by virtue of the boost (lifting) effect given by the resonant LC. In this way, the rectifying circuit 10.5 thus modified is capable of operating, through a suitable control of the electric current controlling elements 23 and 33, also as a buck-boost converter, as well as the ability to operate as rectifier and, possibly, as voltage inverter (i.e. to generate an output voltage Vout of value less than zero, as described above).

Figure 8A:
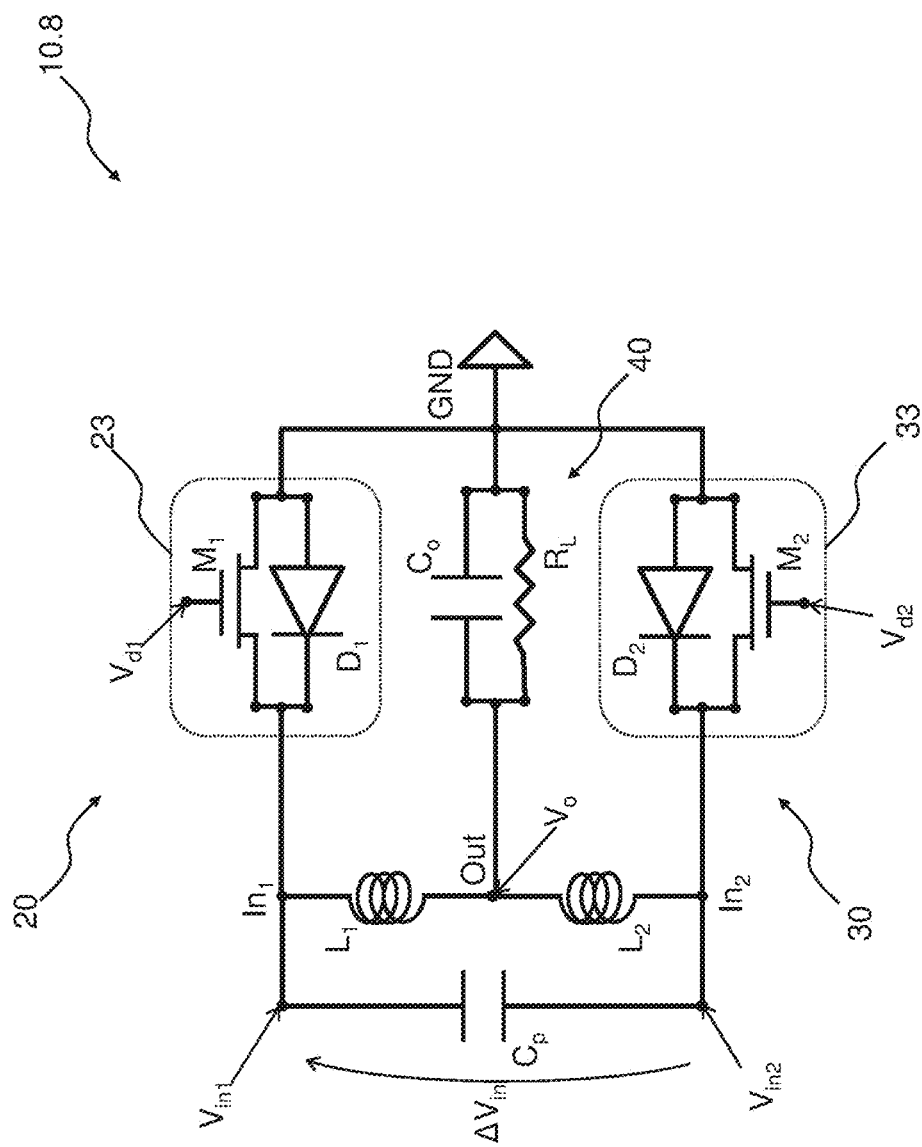

In another embodiment (illustrated in FIG. 8A), the rectifying circuit 10.8 differs from the rectifying circuit 10.3 in that it comprises a reactive element, for example a bridge condenser Cp, connected to both of the input nodes In1 and In2 of the circuit branches 23 and 33, respectively.

Thanks to the presence of the bridge condenser Cp it is possible to prevent the electric current controlling element elements 23 and 33, i.e. diodes D1 and D2 and/or transistors M1 and M2, from operating in a disadvantageous operating condition characterised by high losses due to high voltages and currents that develop across the electric current controlling elements, called hard switching.

Advantageously, the bridge condenser Cp can be sized to define a predetermined second resonance frequency fr2 in combination with the inductive elements L1 and L2. In other words, the bridge condenser Cp, and the inductors L1 and L2 form a resonant tank LC.

Thanks to the correct sizing of the resonant tank consisting of the bridge condenser Cp, and the inductors L1 and L2, it is possible to maximise the power transferred to the load branch 40, in particular to the load resistance Rl, at the same time minimising the power dissipated on the current controllers 23 and 33, operating substantially in Zero Voltage Switching (ZVS) or Zero Current Switching (ZCS) region. This is particularly advantageous in wireless energy transmission devices or systems based on energy harvesting, and makes it possible to make the circuit less affected by variations of input voltage ΔVin, for example through weak and/or not very stable couplings between a primary circuit and a secondary circuit comprising the rectifying circuit 10.

Figure 8B:
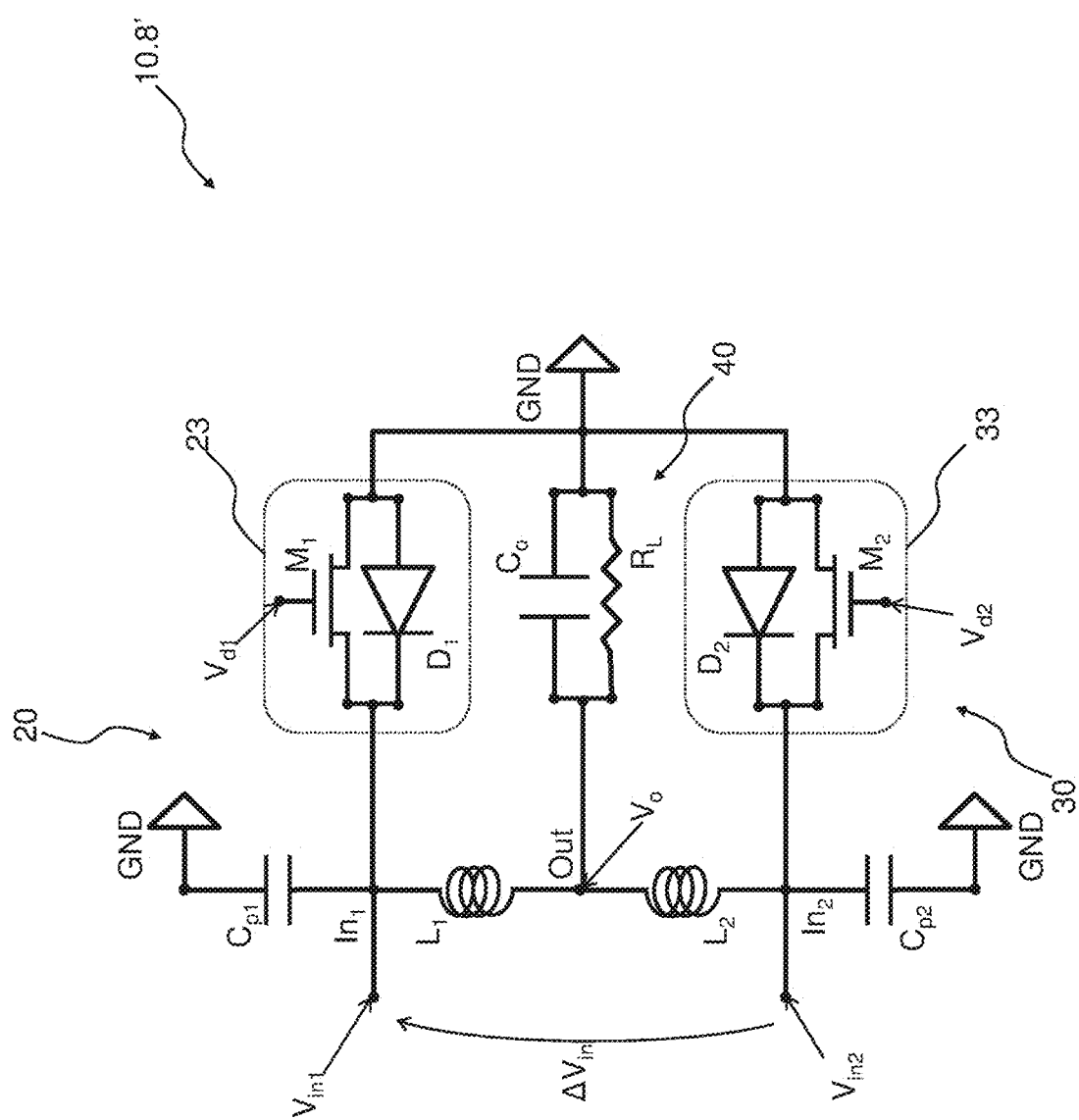
Figure 9:
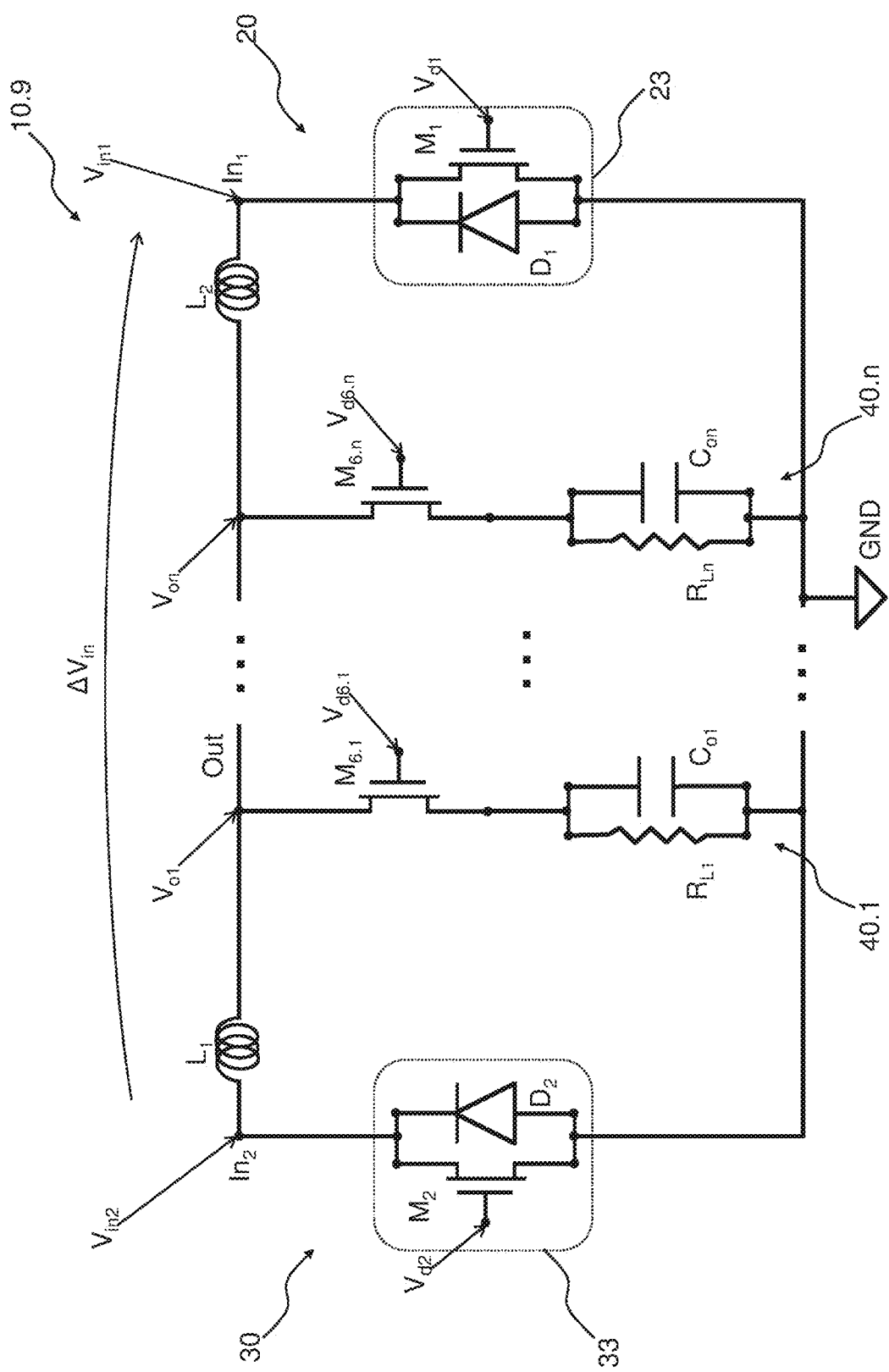

In an alternative embodiment (illustrated in FIG. 8B), the rectifying circuit 10.8' comprises a pair of bridge condensers Cp1 and Cp2. In detail, each bridge condenser Cp1 and Cp2 is connected to a respective input node In1 and In2, and the reference node GND. In other words, each bridge condenser Cp1 and Cp2 is arranged in parallel with a respective current controlling element 23 and 33.

Of course, other embodiments are possible; in particular, it is possible to provide a rectifying circuit according to a further alternative embodiment in which both the decoupling elements between the input terminals and the input nodes, and the capacitive element between the input nodes or the pair of capacitive elements in parallel with the current controlling elements is provided. Advantageously, the decoupling elements and the capacitive element, or the pair of capacitive elements, can be sized so as to define a corresponding resonance frequency in combination with the inductive elements of the rectifying circuit. In other words, the decoupling elements, the capacitive element, or the pair of capacitive elements, and the inductive elements form a resonant tank LC.

In particular, it is possible to operate the rectifying circuit 10.7, 10.7', 10.8 and 10.8' or a combination thereof at the selected resonance frequency, like the resonance frequencies fr1 and fr2, so as to obtain an output voltage Vo of greater value than the value of the input voltage ΔVin.

The rectifying circuit 10 according to embodiments of the present invention can also comprise many output branches, for example arranged in parallel with each other. Hereinafter an alternative embodiment is described, in which a rectifying circuit 10.9, based on the rectifying circuit 10.3, comprises a plurality of output branches 40.1-40.$n$. However, it will be clear to those skilled in the art that analogous alternative embodiments are possible based on any one of the rectifying circuits 10.1-10.8' described above.

In the non-limiting example considered, each output branch 40.1-40.$n$ is connected to the output node Out and to the reference node GND of the rectifying circuit 10.9. Each output branch 40.1-40.$n$ comprises a respective load element, for example a load resistance Rl1-Rln, and a respective reactive element, for example an output condenser Co1-Con, arranged in parallel with one another. In addition, each output branch 40.1-40.$n$ comprises a switch, for example a (selection) transistor M6.1-M6.$n$, arranged in series with the respective parallel pair consisting of load resistance Rl1-Rln and output capacity Co1-Con. In other words, the switch M6.1-M6.$n$, the load resistance Rl1-Rln and the output capacity Co1-Con are connected to an intermediate node Int of the output branch 40.1-40.$n$. Moreover, a terminal of each switch M6.1-M6.$n$ is, preferably, connected to the output node Out of the rectifying circuit 10.9, whereas the load resistance Rl1-Rln and the output capacity Co1-Con are connected to the reference node GND. However, there is no reason why alternative output branches (not illustrated) cannot be structured in which the respective switches are connected to the reference node GND, whereas the load resistance Rl1-Rln and the output capacity Co1-Con are connected to the output node Out. Finally, the control terminal (for example the gate terminal in the case of MOSFET) of each switch M6.1-M6.$n$ is connected to the control module 50 to receive a respective pilot signal Vd6.1-Vd6.$n$.

In detail, each load Rl1-Rln in every output branch 40.1-40.$n$ can require a respective output voltage Vo1-Von, which can in general be of different value from the others. In the embodiment according to the present invention, the rectifying circuit 10.9 can supply electrical energy to the load in accordance with the needs of each load resistance Rl1-Rln by configuring the control module to suitably control the current controlling elements, for example the transistors M1 and M2 during a selection time period t1-$tn$ in which a respective switch M6.1-M6.$n$ is controlled. In this way it is possible to accumulate electrical energy in the output capacity Co.1-Co.n of the selected output branch 40.1-40.$n$, ensuring that the output voltage Vout reaches the value required by the load resistance Rl1-Rln, in a totally independent and dynamically reconfigurable manner by simply acting on the adjustment of the transistors M1 and M2 comprised in the current controlling elements 23 and 33 and of the selection switches M6.1-M6.$n$ of the respective output branches 40.1-40.$n$.

As a function of the selection time period t1-$tn$ of each switch M6.1-M6.$n$ it is possible to ensure the correct power of each load branch 40.1-40.$n$, in particular of the load resistance Rl1-Rln. In general, the load branches 40.1-40.*n* are allocated respective selection time periods t1-*tn* of duration linked to the amount of electrical energy to be absorbed. In other words, the load branches 40.1-40.*n* that absorb greater electrical energy are associated with a respective selection time period t1-*tn*, during which the corresponding switch M6.1-M6.*n* is conductive, more than the selection time period t1-*tn* associated with load branches 40.1-40.*n* that absorb less electrical energy.

The embodiments of the present invention therefore provide rectifying circuits 10 that are particularly compact, simple and cost-effective, which are suitable for managing multiple loads, each requiring a different voltage and capable of absorbing a different current. The proposed rectifying circuit 10.9 combines rectifying function and conversion of the buck (reducer) or buck-boost (reducer/increaser) type, and is suitable for supplying electrical energy through a plurality of output nodes, which are adjustable independently from one another.

As stated above, the rectifying circuit 10.9 can be modified in accordance with one or more variants of the rectifying circuit 10 presented above. For example, it is possible to add suitable reactive elements, for example one or more from the input condensers Cin1 and Cin2 and/or the bridge condenser Cp, and size them so as to obtain a desired resonance frequency, in order to ensure an operation of the rectifying circuit 10.9 thus modified in Zero Voltage Switching or Zero Current Switching mode and/or in order to ensure a buck-boost functionality useful for having an output voltage Vout1-Voutn of desired and independent value, possibly greater than the input voltage ΔVin on each load Rl1-Rln. In particular, the rectifying circuit 10.9 can be modified to comprise current controlling elements 23 and 33 analogous to those implemented in the circuit 10.5, therefore eliminating the effect of the parasitic diodes both in the rectification transistors M1-M3 and M2-M4 and in the selection switches M6.1-M6.*n*. In this way, it is possible to extend a range of possible values for the output voltage Vout1-Voutn on each load Rl1-Rln between a negative minimum value and a positive maximum value as desired, in particular also greater in absolute value than the peak value $\Delta Vin_{MAX}$ of the input voltage ΔVin, in a totally independent and adjustable manner, precisely on each load branch 40.1-40.*n*, by simply acting on the pilot signals Vd1 and Vd2.

The rectifying circuit according to the present invention, further comprises the control module 50, as stated above. Hereinafter, the structure and the operation of the control module is described in relation to the rectifying circuit 10.3 according to the third embodiment described above. However, it will be clear to those skilled in the art that the control module can also be integrated in the rectifying circuits 10.1-10.9, and their variants, described above.

The control module 50 comprises a measuring unit 51 and a pilot unit 53. Preferably, the control module 50 also comprises a powering unit 56 and/or a conditioning unit, or driver 59.

In detail, the measuring unit 51 is connected to the pilot unit 53 and, optionally, to the driver 59. The measuring unit 51 is suitable for measuring at least one value from voltage and electric current at at least one from a node of the circuit and an element of the rectifying circuit. Preferably, the measuring unit is connected to one or more probes coupled with the circuit to measure one or more from a voltage at the input node of the first circuit branch (probe p1); an electric current flowing through the electric current controlling element of the first circuit branch (probe pm1); a voltage at the input node of the second circuit branch (probe p2); an electric current flowing through the electric current controlling element of the second circuit branch (probe pm2); a voltage at the output node of the rectifying circuit (probe po); an electric current flowing through the load element (probe pl), and an electric current flowing through the capacitive element (probe pc). Preferably, the probes for detecting the electric current can comprise shunt resistances, hall effect sensors or another electric current measurement system.

In addition, the measuring unit 51 can combine two or more measurements indicated above to provide a measurement of one or more from a power absorbed by the electric current controlling element of the first circuit branch; a power absorbed by the electric current controlling element of the second circuit branch, and a power absorbed by the load element.

Preferably, the measuring unit 51 is configured to acquire, preferably continuously, measurements of voltage, electric current and/or power described above.

The pilot unit 53 is suitable for generating the pilot signal Vd1 and Vd2 for each transistor M1 and M2 based on the measurements supplied by the measuring unit 51. Moreover, the pilot unit 53 is suitable for supplying the pilot signal Vd1 and Vd2 to the control terminal of the respective transistor M1 and M2, possibly through the mediation of the driver 59. Advantageously, the driver 59 is suitable for receiving the pilot signals Vd1 and Vd2 and adapting, for example amplifying, the values thereof to optimal levels for the transistors M1 and M2. For example, the pilot unit 53 can provide indications to the driver 59 on the value levels to which to bring the pilot signals Vd1 and Vd2, or the driver 59 can operate autonomously in a static or dynamic manner, possibly based on measurements provided by the measuring unit 51.

The powering unit 56 is connected to the other units 51, 53, and 56 of the control module 50 to deliver electrical energy that allows the operation thereof. Preferably, the powering unit 56 is suitable for absorbing electrical energy through the rectifying circuit 10.3, according to a technique called energy harvesting or energy scavenging in the jargon. In an embodiment, the powering unit is connected to the output node Out. In this way, the powering unit 56 absorbs energy from the output node (therefore with voltage and electric current values adjusted by the rectifying circuit 10.3) to supply it to the pilot unit and to the measuring unit for the operation thereof, possibly varying the voltage values based on an operating temperature to optimally power each unit 51, 53 and 59.

In a preferred embodiment (shown in FIG. 10B, where the connections of the measuring unit 51 and of the pilot unit 53 with the circuit have been omitted for the sake of simplicity), the powering unit 56 can be connected to one of the input nodes In1 or In2, preferably through a rectifying circuit—for example a single half-wave rectifier comprising a diode and a condenser—to absorb energy through such an input node In1 or In2. In this way, it is possible to obtain the power supply voltage of the control module 50 using a rectification independent from the main rectification carried out by the rectifying circuit 10.3.

This approach also makes it possible to power the control module 50, at the same time potentially eliminating the activation of the diodes D1 and D2, which in the time periods in which the transistors M1 and M2 are switched off would determine high losses. Moreover, such an approach makes it possible to ensure an effective operation of the rectifying circuits 10 without diodes D1 and D2, in particular in the case of the rectifying circuit 10.5 in which the current controlling elements 23 and 33 comprise transistors M1-M3 and M2-M4 arranged in anti-series, which require pilot signals Vd1 and Vd2 of suitable value.

Even more preferably, the powering unit comprises a low-dropout regulator, typically voltage reducer, particularly suitable for providing a power supply voltage of suitable value for powering the control module with a particularly stable voltage. It will be clear to those skilled in the art that the powering unit 51 can comprise an LDO based on linear circuits or a switching circuit.

However, there is no reason why electrical energy cannot be supplied through a circuitry external to the control module 50—in this case the latter can be without the powering unit 51. Again alternatively, the powering unit 51 can comprise an energy source, for example a battery, to supply energy to the units 51, 53 and 59 of the control module 50 without absorbing energy through nodes of the rectifying circuit 10.3. Moreover, the powering unit 51 can be omitted if the units 51, 53, 59 can be powered directly with the voltage Vo and if the diodes D1 and D2 are present which carry out the rectification of the input signal when the transistors M1 and M2 are switched off since they are not controlled by the control unit, in particular during the starting of the rectifying circuit 10.

In a preferred embodiment, the pilot unit 53 comprises a logic block 61 and a delay estimation block 63.

The delay estimation block 61 is connected to the measuring unit 51, to the powering unit 56 and to the logic block 61. The delay estimation block 63 is suitable for estimating at least one delay associated with a switching of the pilot signal Vd1 and Vd2 supplied to the respective transistor M1 and M2 and a corresponding response of the rectifying circuit based on at least one measured value. In other words, the delay estimation block 63 is suitable for identifying a time period that passes between a switching of the pilot signal Vd1 or Vd2 and a corresponding variation of a voltage and/or electric current value in the rectifying circuit 10.3 measured by the measuring unit 51.

Preferably, the delay estimation block 63 is configured to estimate activation delays $\tau on1$ and $\tau on2$ associated with a first switching of the pilot signal Vd1 and Vd2, respectively, suitable for activating the respective transistor M1 and M2, and the corresponding response of the rectifying circuit 10.3 thereto.

Moreover, the delay estimation block 63 is configured to estimate switching off delays $\tau off1$ and $\tau off2$ associated with a second switching of the pilot signal Vd1 and Vd2, respectively, suitable for switching off the respective transistor M1 and M2, and the corresponding response of the rectifying circuit 10.3 thereto. In a simplified embodiment, the delay estimation block is configured to determine a single activation delay $\tau on1$ or $\tau on2$ and a single switching-off delay $\tau off1$ or $\tau off2$.

The logic block 61 is coupled with the control terminals of the transistors M1 and M2, preferably through the driver 59. The logic block 61 is suitable for generating the pilot signal Vd1 and Vd2 for each transistor M1 and M2 based on the data coming from the measuring unit 51 and the estimated delays $\tau on1$, $\tau on2$, $\tau off1$ and $\tau off2$. Preferably, the logic block 61 is suitable for generating and forming the pilot signal Vd1 and Vd2 for each transistor M1 and M2 based on at least one value measured by the measuring unit 51 and the estimated delays $\tau on1$, $\tau on2$, $\tau off1$ and $\tau off2$.

In an embodiment, the pilot unit 53 or, possibly, the entire control module 50, can be implemented through wired logic or through a microprocessor, a microcontroller, an ASIC, an FPGA or similar integrated systems so as to obtain a more compact structure. In addition, the pilot unit 53 or possibly the entire control module 50 is cost-effective to make in large scale productions.

Moreover, there is no reason why an alternative rectifying circuit (not illustrated) cannot be implemented comprising a single circuit branch 20 or 30, structured according to any one of the embodiments described above; alternatively, the control module 50 can be configured to use only one of the circuit branches 20 or 30 of the rectifying circuit 10 according to any one of the previous claims.

Alternatively or in addition, the rectifying circuit 10.2-10.9 can comprise an electric current controlling element 23 and 33 having more than one respective transistor M1 and M2, preferably arranged in parallel to each other. In this way it is possible to finely adjust an equivalent resistance of the parallel of the transistors during switching-on moments thereof, at the price of a small number of additional transistors.

Figure 10A:
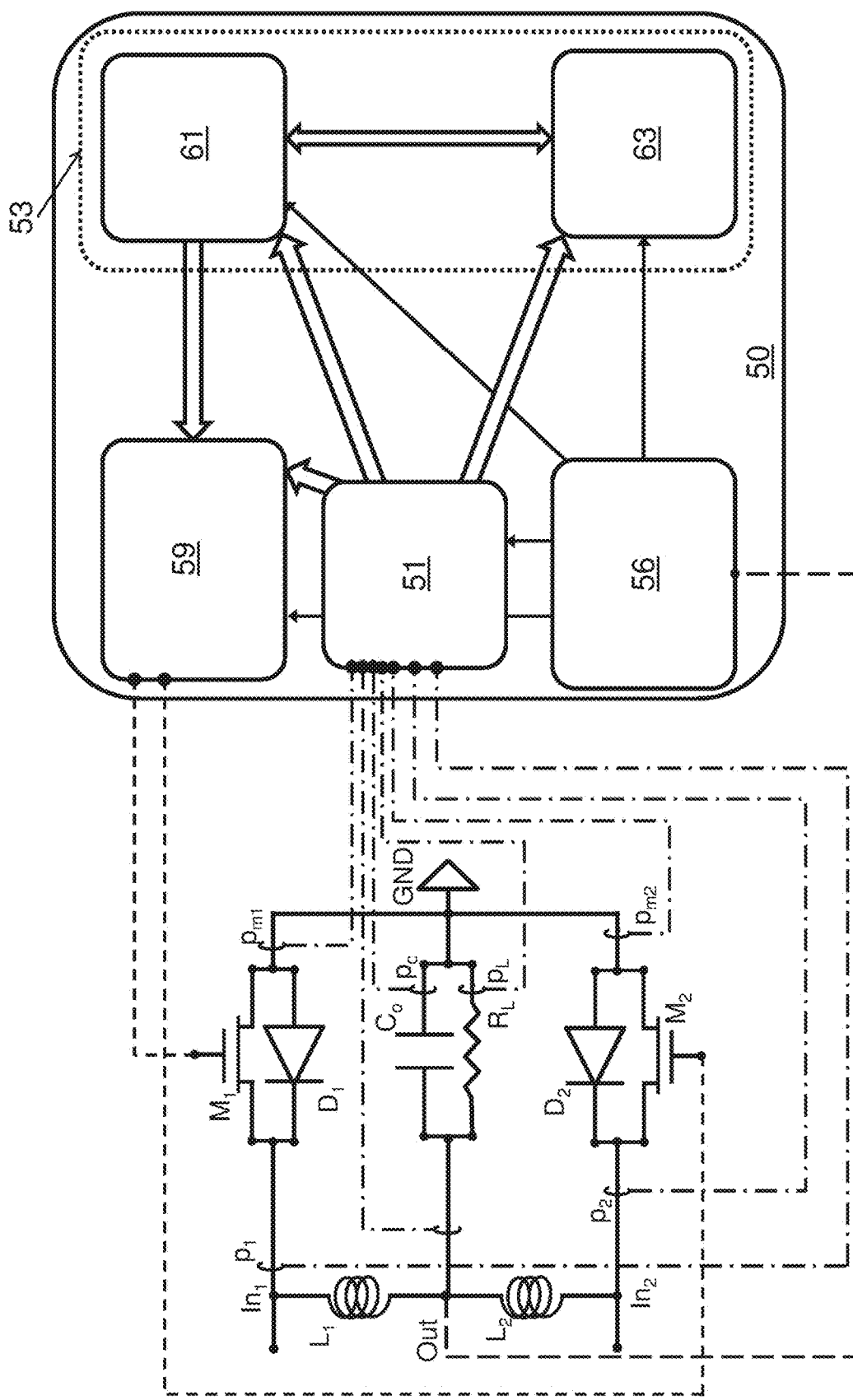
FIGS. 10A and 10B are concept circuit diagrams of a rectifying circuit in which a control module according to respective embodiments of the present invention is schematised.
Figure 10B:
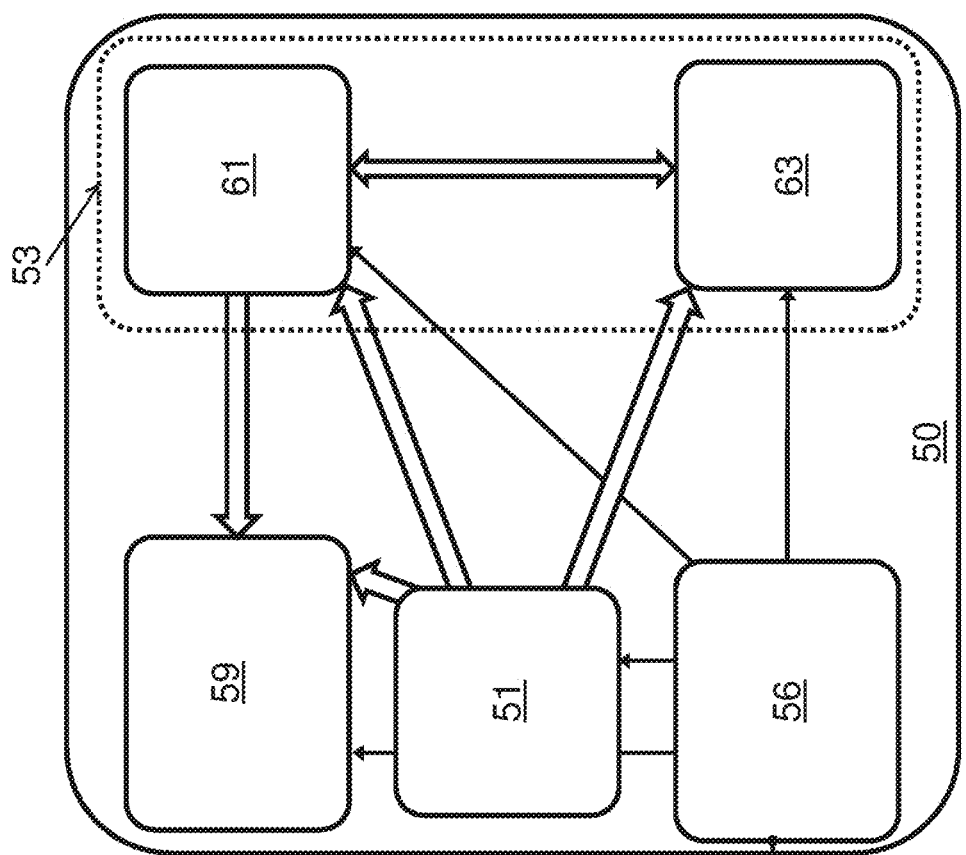
Figure 10B:
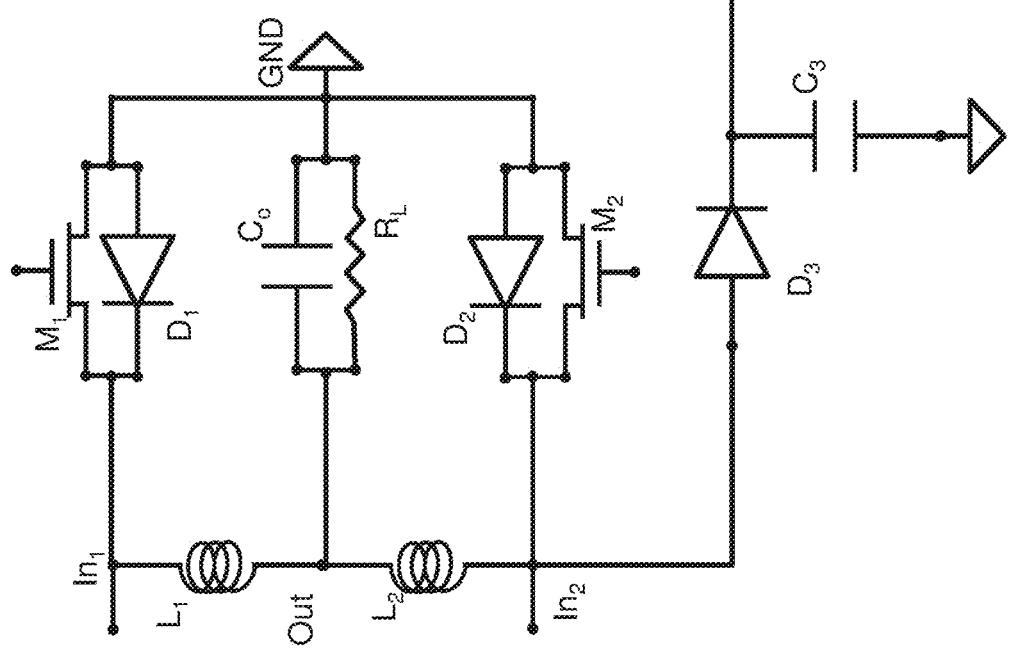

In light of what is described above, hereinafter the operation of the rectifying circuit is described with particular reference to FIG. 10A. Of course, although hereinafter particular reference is made to the rectifying circuit 10.3, analogous advantages can be obtained with the rectifying circuits 10.2, 10.4-10.9 according to the present invention, configured analogously to what is described hereinafter mutatis mutandis.

The rectifying circuit 10.3 makes it possible to supply the output node Out with an output voltage Vo of substantially constant value over time and predetermined with regard to a signal of input voltage $\Delta Vin$ that is variable, preferably periodically, over time. In particular, the input voltage $\Delta Vin$ comprises half-waves, for example positive and negative, opposite and alternate, preferably periodically. The half-waves of the input voltage $\Delta Vin$ can have a fixed or variable amplitude less than or equal to a maximum or peak absolute value $|\Delta Vin_{MAX}|$. The rectifying circuit 10.3 can be configured to rectify the input voltage $\Delta Vin$ with analogous mode to a double half-wave rectification based on a centre-tapped transformer, but without the need for a transformer element, with particularly efficient synchronous rectifying capability even at very high frequencies, and therefore with reduction of bulk, of costs and of energy dissipation. Preferably, each circuit branch 20 and 30 is configured and controlled by the control module 50 to rectify the respective half-waves—for example, the circuit branch 20 is configured to rectify positive half-waves of the input voltage $\Delta Vin$, whereas the circuit branch 30 is configured to rectify negative half-waves of the input voltage $\Delta Vin$. In other words, each circuit branch 20 and 30 is configured and controlled to supply the output node Out with an output voltage Vo of substantially constant value over time by converting respective half-waves of the input voltage $\Delta Vin$.

Control Procedures of the Transistors

In detail, the operation of the rectifying circuit 10.3 is determined by the control module 50 that determines the activation and the switching off of the transistors M1 and M2.

According to an embodiment, the measuring unit 51 is configured to acquire only node voltage measurements Vin1 and Vin2 at the input nodes In1 and In2, respectively. The pilot unit 53 is configured to minimise the voltage between the terminals of each current controlling element 23 and 33 at least when the node voltage Vin1 and Vin2 at the respective input node In1 and In2 is less than the reference voltage GND. For example, the pilot unit 53 can be configured to generate pilot signals Vd1 and Vd2 such as to activate the transistor M1 and the transistor M2 when the node voltage Vin1 and Vin2 at the respective input node In1 and In2 from positive becomes zero.

In an embodiment, preferably in the case of 'heavy load' condition and/or for operating frequencies such as to prevent operation in hard switching condition of transistors or diodes, therefore frequencies typically greater than hundreds of kHz, MHz or tens of MHz—it should be observed that the specific values or ranges of values so that such frequencies are considered high depends on the constructive technology of diodes and/or transistors used in the rectifying circuit 10, the pilot unit 53 is configured to generate pilot signals Vd1 and Vd2 such as to activate the transistor M1 when the node voltage Vin1 from positive becomes zero. At the same time, the pilot unit 53 is configured to generate pilot signals Vd1 and Vd2 such as to activate the transistor M2 and deactivate the transistor M1 when the node voltage Vin2 from positive becomes zero.

In particular, assuming that the input signal ΔVin possesses a temporal symmetry of positive and negative half-periods, it is sufficient to configure the measuring unit 51 to acquire only one from the node voltages Vin1 and Vin2, exploiting the complementarity in the activation of the transistors M1 and M2, therefore controlling the transistor M1 or M2 relative to which there are no useful measurements with a signal Vd1 or Vd2, respectively, in counter-phase to the signal Vd2 or Vd1 that controls the transistor M2 or M1 with regard to which the measurement useful for the control is possessed.

According to an embodiment, the measuring unit 51 is configured to determine the electric current flowing through the electric current controlling elements 23 and 33, i.e. the electric current that flows in the first circuit branch 20 and in the second circuit branch 30. The pilot unit 53 is therefore configured to minimise the electric current flowing through each current controlling element 23 and 33 at least when the input voltage applied to the terminal of the controller element is greater than the reference voltage. For example, the pilot unit 53 can be configured to generate pilot signals Vd1 and Vd2 such as to activate the transistors M1 and M2 when the electric current that flows through the electric current controlling element 23 and 33, respectively, from zero becomes positive and, conversely, deactivate M1 and M2 when the electric current that flows through the electric current controlling element 23 and 33, respectively, from positive becomes zero. In the present document, a positive electric current is assumed to be an electric current having a direction that flows from anode towards cathode through D1 or D2 and/or that flows from the source towards the drain of M1 or M2.

According to an embodiment, the measuring unit 51 is configured to measure the electric current that flows through the output condenser Co. In this case, the pilot unit 53 is configured to generate pilot signals Vd1 and Vd2 such as to activate a selected one of the transistors M1 or M2 alternately when the electric current that flows through the output capacity Co from negative goes to zero then becoming positive, and deactivate such a transistor M1 or M2 when the electric current that flows in the output capacity Co from positive becomes zero. As will be clear to those skilled in the art, the term negative electric current through output capacity Co is meant to indicate an electric current that powers the load resistance Rl, and the term positive electric current through the output capacity Co is meant to indicate an electric current that charges the capacity Co. According to an embodiment of the present invention, the pilot unit 53 is configured to identify which transistor M1 or M2 to activate during a first half-wave conversion cycle according to one from the following strategies. A first strategy provides for arbitrarily selecting to switch on one of the transistors M1 or M2 (first attempt selection) and monitoring the progression of the electric current through the output condenser Co, of the current of the load resistance Rl, of the output voltage Vo with respect to the moment prior to switching on M1 or M2.

A different embodiment foresees to use a second measurement, for example the measurement of the node voltage Vin1 or Vin2, to select the transistor to switch on from M1 and M2.

In addition, it should be observed that the output capacity Co can be formed from a plurality of output filter capacities Co1, Co2, . . . , Con, coupled in parallel in order to reduce the series resistance of the filter system. In this case, it is possible to configure the measuring unit to measure the electric current through only one of the capacities Co1, Co2, . . . , Con, therefore reducing the losses linked to the measurement.

In general, other configurations based on measurements and combinations of measurements are possible, without this constituting a significant variation thereof.

In the case of the rectifying circuit 10.2, i.e. in which the electric current controlling elements 23 and 33 comprise only a respective transistor M1 and M2, preferably if the switches M1 and M2 are made through BJT, IGBT or HEMT transistor for example of the GaN type, it is possible to configure the control module 50 in the following way.

The measuring unit 51 is configured to measure the node voltages Vin1 and Vin2 at the input nodes In1 and In2, the output voltage Vo at the output node Out, and the electric currents through the electric current controlling elements 23 and 33, through the load resistance Rl and through the output condenser Co. Moreover, the pilot unit 53 is configured to generate pilot signals Vd1 and Vd2 suitable for activating M1 and M2 when respectively the node voltages Vin1 and Vin2 are such as to inversely polarise the transistors M1 and M2, i.e. in the moments when the node voltages Vin1 and Vin2 from positive become zero and then tend to become negative, and subsequently deactivating the transistors M1 and M2 when the electric current through the electric current controlling elements 23 and 33 or through the output condenser Co that passes through the transistors M1 and M2 tends towards zero, therefore so as to simulate the behaviour of an ideal diode, therefore with zero or close to zero direct polarisation voltage, and therefore substantially without losses. This procedure makes it possible, together with the use of fast switches like for example HEMT of the GaN type and/or of current controlling elements 23 and 33 with transistors in anti-series, to eliminate the intervention of the diodes D1 and D2 and/or not have the diodes D1 and D2 at all and substantially increase the efficiency of the circuit, at the same time reducing the number of elements, in particular powering devices, necessary for making the rectifying circuit.

Delay Estimation

The control module 50 according to the present invention makes it possible to eliminate the delays linked to the reading of the measurements provided by the measuring unit, to the processing necessary at the pilot block 61 to form the signals Vd1 and Vd2, to the conditioning of the signals Vd1 and Vd2 by the driver 59 and to the reaction speed of the transistors M1 and M2 to the switching of the respective signals Vd1 and Vd2. In detail, a total delay resulting from the sum of the aforementioned delays can be typically of the order of ns, tens of ns or even hundreds of ns, which is capable of substantially reducing the maximum operating frequency of the rectifying circuit 10.3 (and, similarly, the rectifying circuits 10.2 10.4-10.9). These delays depend both on the single elements used and on the variability of the production process, but also on factors that are variable over time, for example the operating temperature thereof. It will be clear to those skilled in the art how the aforementioned delays not only cannot be eliminated and are substantial, but are variable for each single component used in the rectifying circuit 10.2-10.9, and also in the ideal case of components having perfectly identical characteristics, there will be variations between such components as a function of the particular instantaneous conditions (for example, operating temperature, voltages and currents applied, etc.) thereof, therefore making it difficult to optimise the behaviour of the rectifying circuit 10.2-10.9. Thanks to the presence of the delay estimation block 63 it is possible to refine the operation of the control circuit 10.2-10.9 as follows:

In a preferred embodiment, the logic block 61 is configured to form at least one first test pilot signal and/or a second test pilot signal with switching at predetermined moments—also indicated with the term pulses hereinafter—and supply them to the transistor M1 of the first circuit branch 20 and to the transistor M2 of the second circuit branch 30, respectively. Moreover, the delay estimation block 63 is configured to estimate a delay in the response of the rectifying circuit to the pulses.

Preferably, the logic block 61 is configured to generate the test pilot signals upon an activation, i.e. at the switching on, of the control module 50. At the same time, the logic block 61 is configured to control, for example through a corresponding estimation start signal, the delay estimation block 63 to start a delay estimation procedure.

Preferably, the pulses of the initial test signals—i.e. pulses of the test signals generated before the delay estimation block 63 has carried out the measurements—can be generated by the logic block 61 considering a respective initial delay $\tau on1$, $\tau on2$, $\tau off1$, and $\tau off2$ with zero value, or with a predetermined value—for example predetermined by the manufacturer and/or based on estimations carried out earlier. Consequently, the pulses are generated in advance with respect to an ideal switching on or off time of the transistors M1 and M2 in the case of zero delays.

Thereafter, the measuring unit 51 carries out the measurements of one or more electrical magnitudes as described above and provides it to the delay estimation block 63. In particular, the measuring unit 51 is configured to measure one or more electrical magnitudes with a frequency such as to allow the delay estimation block 63 to evaluate the time passed between the generation of the pulse by the logic block 61 and the response of the circuit to it, i.e. a variation in the measurement of the one or more electrical magnitudes supplied by the measuring unit 51. In this way, the delay estimation block 63 is capable of accurately estimating the value of the delays $\tau on1$, $\tau on2$, $\tau off1$, and $\tau off2$. The delay estimation block 63 thus provides the estimated values of the delays $\tau on1$, $\tau on2$, $\tau off1$, and $\tau off2$ at the logic block 61.

Based on the estimated values of the delays $\tau on1$, $\tau on2$, $\tau off1$, and $\tau off2$ the logic block 61 can therefore compensate for such delays $\tau on1$, $\tau on2$, $\tau off1$, and $\tau off2$ bringing forward the switching, i.e. the pulses of the pilot signals Vd1 and Vd2 during a subsequent operating cycle. In general, the control module is configured to form pilot signals Vd1 and Vd2 comprising switching, or pulses, at moments based on the switching times of the previous operating cycle, to which the entire time period T of an operating cycle is added and from which the value of the corresponding estimated delay $\tau on1$, $\tau on2$, $\tau off1$, and $\tau off2$ is subtracted.

It will be clear to those skilled in the art that the independent estimation of the values of each delay $\tau on1$, $\tau on2$, $\tau off1$, and $\tau off2$ allows an accurate and dynamic compensation thereof and, therefore, better operating efficiency of the rectifying circuit 10.3. This is due to the fact that the switching-on delays $\tau on1$ and $\tau on2$ and the switching-off delays $\tau off1$ and $\tau off2$ in general assume different values from each other. However, there is no reason why the control module 50 cannot be configured to carry out a compensation of the delays $\tau on1$, $\tau on2$, $\tau off1$, and $\tau off2$ by estimating a sub-set of the values thereof.

The delay calculation system of the delay estimation block 63 can be based on different principles.

In an embodiment, the delay estimation block 63 is configured to estimate the value of the delays $\tau on1$, $\tau on2$, $\tau off1$, and $\tau off2$ based on the measurements of one or more of the electric currents through the electric current controlling elements 23 and 33, through the load resistance RI and through the output condenser Co, provided by the measuring unit 51. In particular, the delay estimation block 63 is configured to determine a variation of electric current measured by the measuring unit 51 as a function of the corresponding pilot signal Vd1 and/or Vd2 generated by the logic block 61.

In the rectifying circuit 10.3 the diodes D1 and D2 allow a flow of electric current for values of the node voltages Vin1 and Vin2 at the input nodes such as to activate them. At the same time, in the case of zero or predetermined initial value of the delays $\tau on1$, $\tau on2$, $\tau off1$, and $\tau off2$ and, therefore, not ideal, there is a late intervention of the transistors M1 and M2. Consequently, the measuring unit 51 detects one or more of the electric currents through the electric current controlling elements 23 and 33, through the load resistance RI and through the output condenser Co having a value that is altered at the intervention of the transistors M1 and M2 only after a certain time period from the corresponding pulse of the pilot signal Vd1 and/or Vd2. The delay estimation block 63 can estimate such a time period and, therefore, the respective value of the delays $\tau on1$, $\tau on2$, $\tau off1$, and $\tau off2$ to be compensated in the subsequent operating cycles. In this way, a feedback control is obtained that minimises the variation of intensity of electric current determined by the intervention of the transistors M1 and M2 with respect to the intervention of the diodes D1 and D2, bringing forward the generation of pulses in one or both of the pilot signals by a value substantially corresponding to the value of the delays $\tau on1$, $\tau on2$, $\tau off1$, and $\tau off2$.

In an embodiment, the delay estimation block 63 is configured to estimate the value of the delays $\tau on1$, $\tau on2$, $\tau off1$, and $\tau off2$ based on the measurements of the values of one or both of the node voltages Vin1 and Vin2, observing the delay with which they are altered by the activation of the transistors M1 and M2—such activation substantially takes the input node In1 or In2, respectively, to the reference voltage GND.

In an embodiment, the delay estimation block 63 is configured to estimate the value of the delays $\tau on1$, $\tau on2$, $\tau off1$, and $\tau off2$ by combining the procedures described above. Advantageously, the delay estimation block 63 is configured to estimate the value of the switching-on delays $\tau on1$ and $\tau on2$ based on the measurement of the node voltage values Vin1 and Vin2 at the input nodes In1 and In2, respectively. Differently, the delay estimation block 63 is configured to estimate the value of the switching-off delays $\tau off1$ and $\tau off2$ based on the measurements of one or more of the electric currents through the electric current controlling elements 23 and 33, through the load resistance RI and through the output condenser Co. In this way, it is possible to obtain particularly accurate values of the delays $\tau on1$, $\tau on2$, $\tau off1$, and $\tau off2$ by using measurements of electrical magnitudes suitable for evaluating the switching-on delays $\tau on1$ and $\tau on2$ and the switching-off delays $\tau off1$ and $\tau off2$ more accurately.

In an embodiment, the delay estimation block 63 is configured to estimate the value of the delays $\tau on1$, $\tau on2$, $\tau off1$, and $\tau off2$ based on the power absorbed by the current controlling elements 23 and 33 (i.e. the parallels of diode D1 and transistor M1, and diode D2 and transistor M2, respectively). At the same time, the logic block is configured to exploit the estimation of the value of the delays $\tau on1$, $\tau on2$, $\tau off1$, and $\tau off2$ so as to form pilot signals Vd1 and Vd2 such as to minimise such power absorbed. In other words, the control module 50 is configured to implement a feedback aimed at minimising a power consumption of the rectifying circuit 10.3 by the active components (i.e. transistors M1 and M2 and diodes D1 and D2) and thus improve the global efficiency thereof. Indeed, a delayed switching on and off of the transistors M1 and M2 with respect to an activation and a deactivation of the conductive state in the diodes D1 and D2 results in an increase in the total power lost by the parallel of transistor M1 and diode D1, and transistor M2 and diode D2. Advantageously, the measuring unit 51 can be configured to provide a measurement of the instantaneous and/or average power—for example, on an operating cycle or on many operating cycles. For example, the measuring unit 51 can be configured to measure the power absorbed by the current controlling elements 23 and 33 based on the measurement of current flowing through them, possibly combined with the measurement of the node voltage Vin1 and Vin2 at the input nodes In1 and In2 of the respective circuit branch 20 and 30.

In an embodiment, the delay estimation block 63 is configured to estimate the value of the delays $\tau on1$, $\tau on2$, $\tau off1$, and $\tau off2$ based on the power absorbed by the load branch 40 or, preferably, by the load resistance Rl. At the same time, the logic block is configured to exploit the estimation of the value of the delays $\tau on1$, $\tau on2$, $\tau off1$, and $\tau off2$ so as to form pilot signals Vd1 and Vd2 such as to maximise such power absorbed. In other words, the control module 50 is configured to implement a feedback aimed at maximising a power delivered by the rectifying circuit 10.3 to the load, thus maximising the efficiency of the rectifying circuit 10.3.

An embodiment, particularly advantageous if the transistors M1 and M2 are characterised by low losses due to hard switching and are symmetrical switches as described earlier, in the case of the rectifying circuit 10.5—in which the current controlling elements 23 and 33 comprise transistors in anti-series—or, furthermore, in the case of the rectifying circuit 10.6—in which the transistor 10.6 is provided in series with the output branch 40 and in anti-series with the transistors of the current controlling elements 23 and 33—, foresees to configure the delay estimation block 63 to estimate the value of the delays $\tau on1$, $\tau on2$, $\tau off1$, and $\tau off2$ based on a time that passes between a moment of the activation or deactivation pulse of the pilot signal Vd1 and Vd2 and a moment in which the measuring unit 51 measures a variation in one or more of the electric currents through the electric current controlling elements 23 and 33, through the load resistance Rl and through the output condenser Co or a variation of node voltage Vin1 and Vin2 at the input nodes In1 and In2. In particular, it may be particularly advantageous to configure the delay estimation block 63 to estimate the value of the switching-on delays $\tau on1$ and $\tau on2$ based on the measurement of the node voltage values Vin1 and Vin2 at the input nodes In1 and In2, since the electric currents are substantially zero in the current controlling elements 23 and 33 that implement transistors with parasitic diodes of negligible effect and/or in which the effect of the body diode is eliminated, for example in the case of use of pairs of transistors in counter-series also in the presence of inverse polarisations between conduction terminals. Differently, the delay estimation block 63 is advantageously configured to estimate the value of the switching-off delays $\tau off1$ and $\tau off2$ based on the measurements of one or more of the electric currents through the electric current controlling elements 23 and 33, through the load resistance Rl and through the output condenser Co, since the node voltage Vin1 and Vin2 at input nodes In1 and In2 remains substantially zero until the transistors M1 and M2 are deactivated.

Finally, it should be emphasised that the rectifying circuit 10.2, and the rectifying circuits 10.5 and 10.6 based on pairs of transistors arranged in counter-series—thus without the possibility of spontaneous activation of the body diodes—can be used effectively to selectively rectify the input voltage ΔVin, therefore making it possible to partially rectify the waveform of the input voltage ΔVin, through adjustment of the switching-on time of the transistors M1 and M2 or through a skip (omission) of rectification operating cycles. In other words, the control module 50 controls the transistors comprised in the current controlling elements 23 and 33 so as not to carry out a rectification of selected half-waves (for example, periodically over time or based on a predetermined number of consecutive half-waves converted) of the input voltage ΔVin. This way of operating allows the rectifying circuit 10.2, and the rectifying circuits 10.5 and 10.6 proposed to act at the same time as voltage rectifier and as voltage reducing circuit, ensuring a low cost and a high circuit compactness. Moreover, the Applicant highlights the fact that, by combining the correct tuning of the capacities Cin1 and Cin2 and of the inductances L1 and L2 in a variant (not illustrated) of the rectifying circuit 10.7 or 10.7' comprising symmetrical switching elements and without the possibility of spontaneous activation of the body diodes, it is possible to make rectifying circuits with the function of very versatile reducers/increasers of output voltage Vo (with respect to the input voltage ΔVin), capable of always ensuring the correct powering of the load resistance Rl for a wide range of input voltage values ΔVin, in a cost-effective, compact and simple manner.

Moreover, the Applicant highlights the fact that, in variants of the rectifying circuit 10.5 and of the circuit 10.6 comprising pairs of transistors arranged in counter-series and thus without the possibility of spontaneous activation of the body diodes it is possible to make rectifying circuits that can deliver voltages in output that are not only adjustable, but also negative, by simply inverting the order of switching on of the pairs of transistors corresponding to M1 and M2, therefore switching on M1 when the node voltage Vin1 from negative goes to zero tending to become positive, switching off M1 when the current that passes through M1 from negative goes to zero tending to become positive, and similarly switching on M2 when the node voltage Vin2 from negative goes to zero tending to become positive, switching off M2 when the current that passes through M2 from negative goes to zero tending to become positive.

It should be emphasised that the combination of the switching-on sequence of M1 and M2 with respect to the progression of the input voltage ΔVin applied between the nodes In1 and In2, the presence of resonances and the partial rectification of the waveforms of the input voltage ΔVin, possibly obtained by skipping rectification cycles, makes it possible to obtain an output voltage Vo that is variable between a maximum that is a positive multiple of the input voltage value ΔVin and a minimum that is a negative multiple of the input voltage value ΔVin (for example from n times $|\Delta Vin_{MAX}|$ to −n times $|\Delta Vin_{MAX}|$), by simply modifying the control of the transistors M1 and M2.

Preferably, regardless of the delay estimation procedure τon1, τon2, τoff1, and τoff2 implemented, the estimation of the delays τon1, τon2, τoff1, and τoff2 is carried out during the entire operating period of the rectifying circuit 10.3, also dynamically compensating for variations in the value of the delays τon1, τon2, τoff1, and τoff2 that can be necessary during the normal operation of the rectifying circuit, for example following variations of operating temperatures of the elements of the circuit.

Applications

The proposed rectifying circuit 10, in each of its variants, has multiple applications, in particular in the field of power circuits both of the insulated and non-insulated type.

Between the insulated power circuits it should be emphasised that the rectifying circuit 10 according to embodiments of the present invention can be used effectively both in insulated power circuits in which a primary circuit and a secondary circuit are part of the same device (or of the same on-board system), as occurs for example in insulated AC/DC and DC/DC power suppliers—for example circuits of the flyback, SEPIC type, etc., and in insulated power circuits in which the primary circuit and the secondary circuit are comprised in, or constitute, physically separate devices, as occurs in wireless energy transmission systems, in which there is a primary energy transmission circuit arranged in a recharging and powering device and a secondary energy receiving circuit connected to or integrated in the device to be powered or charged.

In particular, the rectifying circuit 10 according to embodiments of the present invention can be used effectively in power devices in which the primary circuit and the secondary circuit are electrically separate and inductively coupled with each other, for example through a transformer, a circuit solution also indicated as 'inductive insulation' in the jargon.

In this case the inductors L1 and L2 are replaced by the secondary windings of a centre-tapped transformer. With respect to circuit schemes known in the field based on a centre-tapped transformer, the proposed system allows an effective rectification of the voltage at the input nodes capable of compensating for the intrinsic delays of the rectifying circuit 10, ensuring a more effective and efficient rectification, at the same time, allowing an operation at much higher frequencies with respect to the frequencies that can be reached through known circuit schemes.

Moreover, the rectifying circuit according to the present invention can be used effectively in a power device, for example a powering device (or an on-board powering system) to implement a voltage/current increasing-decreasing stage, since it can be configured so as to increase, lower or make negative in a regulated and effective manner the output voltage Vo with respect to the input voltage ΔVin. Advantageously, such a result is obtained by the rectifying circuit 10 according to embodiments of the present invention without needing additional stages and/or components, and without introducing further losses in the rectifying circuit 10.

Moreover, the rectifying circuit according to the present invention, in particular the circuit 10.9 or, similarly, a variant of the rectifying circuits 10.1-10.8 in which many output branches are implemented, can be used in a power device, for example a powering device to provide multiple output voltages, positive or negative without distinction, useful for powering different mutually independent loads.

Moreover, the rectifying circuit 10 according to embodiments of the present invention can be used effectively in power devices in which the primary circuit and the secondary circuit are physically separate and coupled with each other in a capacitive manner, for example through interfacing armatures, a circuit solution also indicated as 'capacitive insulation' in the jargon. Such capacitive insulation between primary and secondary, capable of substantially reducing bulk, losses and costs of conventional insulated AC/DC and DC/DC energy conversion systems, in particular removing the need for a transformer and/or coils.

Figure 11:
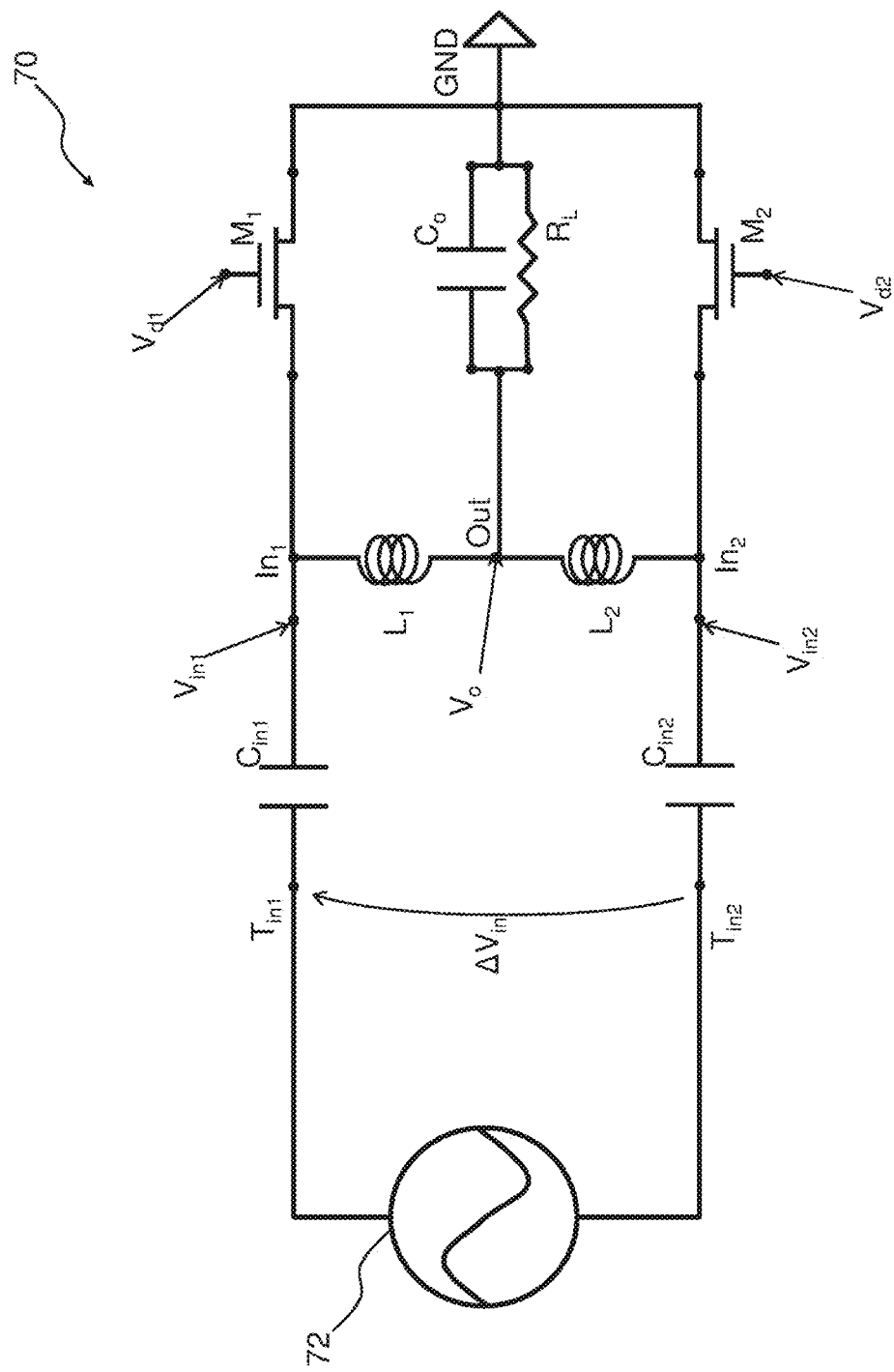
FIG. 11 is a concept circuit diagram of a power device according to an embodiment of the present invention.

An example of a power device 70 with capacitive insulation is illustrated in FIG. 11. In the non-limiting example of FIG. 11, the rectifying circuit 10.2, without diodes D1 and D2, and with input condensers Cin1 and Cin2 described above in relation to the rectifying circuit 10.7. The rectifying circuit 10.2 is excited through the input condensers Cin1 and Cin2 to which a high frequency generator 72 is connected, typically in the order of hundreds of kHz, MHz, or even tends of hundreds of MHz.

Those skilled in the art will appreciate that the power device 70 can operate at frequencies substantially higher than the operating frequencies of known insulated power devices with transformer limited by known rectifying circuits.

In particular, the capacitive insulation of the power device 70 is substantially better with respect to known power devices thanks to the high operating frequencies reached at which the input condensers Cin1 and Cin2 get closer to an ideal behaviour.

In embodiments, the high frequency generator 72 can comprise linear or switching amplifiers, for example based on bridge H, half bridge, or even resonant schemes such as class E, or inverse class E, class F or inverse class F, E/F, resonant D, H, or others. Possible other resonance or modulation reactances of the power transferred to the secondary circuit added to the device do not need to significantly alter the rectifying circuit according to embodiments of the present invention.

The power device 70 can be effectively implemented both as insulated DC-DC circuit, and as insulated AC-DC circuit, thus replacing the powering circuits with a solution that is particularly compact, by virtue of the very high operating frequencies, and efficient.

The Applicant finally highlights how, at the aforementioned frequencies at which the proposed rectifying circuit operates, since the rectification part is conventionally the most critical short circuit in high frequency voltage converters, the value of the inductors L1 and L2 is reduced to extremely low values and sizes, for example hundreds of nH or less, to the point of eliminating the need for cores made up of ferromagnetic material, for example ferrites, and therefore also reducing losses connected to them.

Of course, any embodiment of the rectifying circuit 10.1-10.9 can be implemented in a power device 70, as described above, as an alternative to the rectifying circuit 10.2 considered here. In particular, a power device substantially corresponding to the power device 70 can be obtained by using the rectifying circuits 10.5 and 10.6 that implement techniques suitable for obtaining a symmetrical behaviour by transistors of the MOSFET type and, in particular, cut the negative effects caused by the parasitic diodes.

The rectifying circuit 10 according to embodiments of the present invention is particularly suitable for use in wireless energy transmission systems, therefore circuits in which the primary transmission circuit and the secondary receiving circuit are arranged in physically and electrically separate devices.

Typically, in wireless energy transmission systems the secondary circuit, or receiving circuit, is equipped with a receiving element and with a rectifying circuit useful for powering a load with the energy received by the receiving element.

The rectifying circuit 10 is suitable for use in wireless energy transfer systems of the inductive, capacitive and radio frequency type.

Inductive Transmission

In systems based on the inductive transmission of energy, the transmission and receiving elements are typically reactances having a mainly inductive behaviour at the operating frequencies, typically coils coupled with each other in order to transmit energy from a transmission circuit to a receiving circuit.

Figure 12:
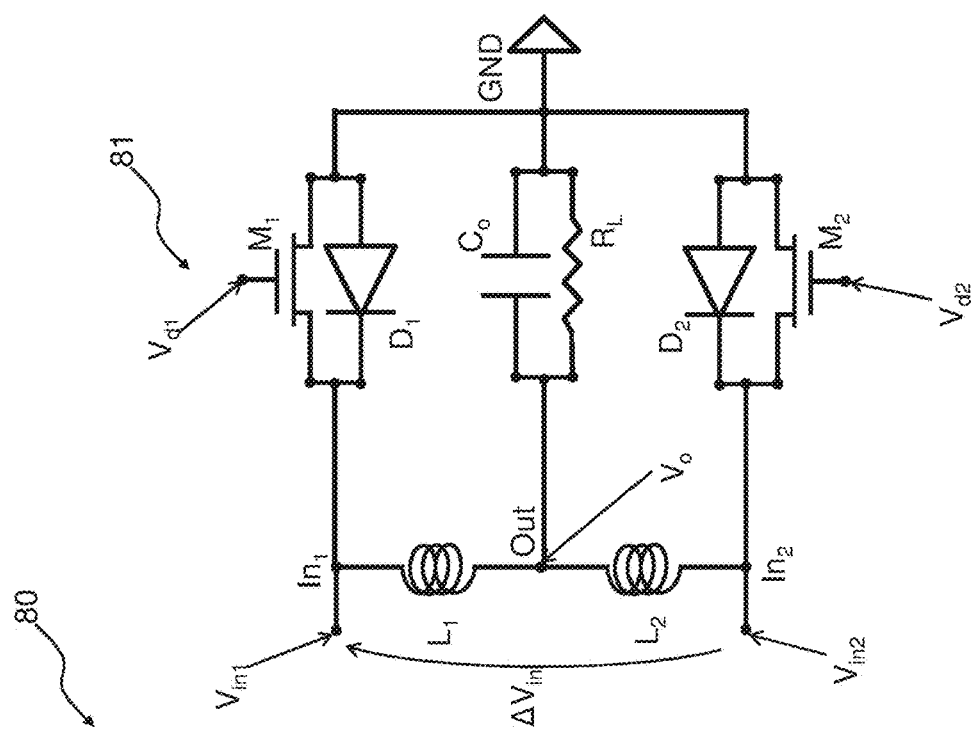
FIG. 12 is a concept circuit diagram of the inductive energy transfer system according to an embodiment of the present invention.
Figure 12:
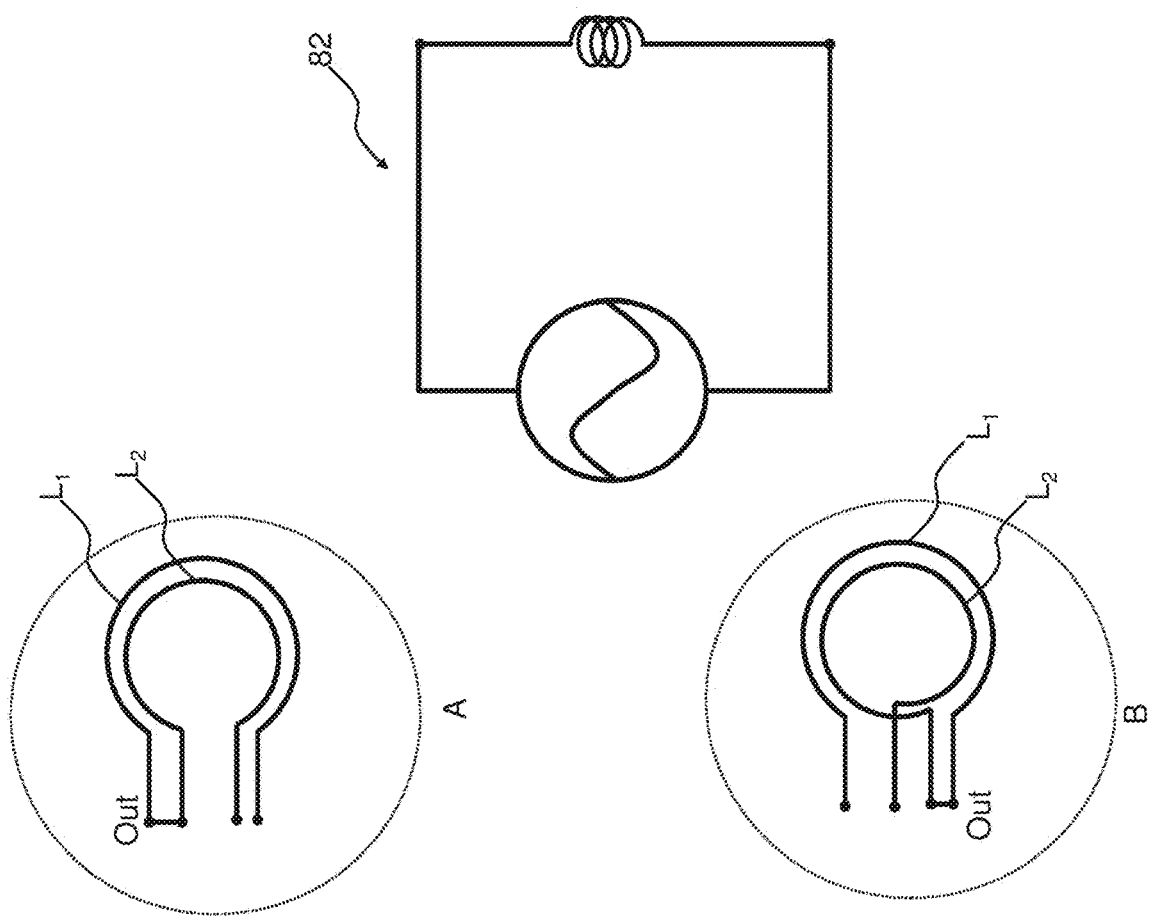

In an embodiment of the present invention, an inductive receiver circuit 81 of a wireless energy transmission system 80 of the inductive type (illustrated in FIG. 12) comprises the rectifying circuit 10 according to one of the embodiments described above, for example the rectifying circuit 10.3. Preferably, each inductive element comprises a respective receiving coil L1 and L2. Even more preferably, the coils L1 and L2 can typically overlap one another, or in any case having a geometry such as to both be hit by the magnetic field generated by the transmission circuit 82.

It should be noted that it is possible to wind the receiving coils L1 and L2 so as to simultaneously activate the rectification diodes D1 and D2, and/or the transistors M1 and M2, or so as to activate the diodes D1 and D2 and/or the transistors M1 and M2 alternately, by simply modifying the winding direction of the coil L2 with respect to the coil L1. Specifically, in order to obtain operation of the diodes D1 and D2, and/or the transistors M1 and M2 in an alternate manner—useful for minimising the oscillations of the output voltage Vo and therefore reducing the voltage ripple—the coils L1 and L2 are wound so that the second coil L2 is substantially the continuation of the first coil L1, as illustrated in the detail B of FIG. 12. Differently, in order to obtain operation of the diodes D1 and D2, and/or the transistors M1 and M2 in a simultaneous manner—useful for minimising a total inductance value of the coils L1 and L2 necessary for the correct operation of the circuit—the coils L1 and L2 are wound so that the second coil L2 is connected to the first coil L1 as illustrated in detail A of FIG. 12.

The inductive receiver circuit 81 according to the present invention therefore makes it possible to greatly reduce the losses in the wireless energy transmission systems based on inductive couplings, resonant both in series and in parallel, as well as non-resonant, greatly reducing the losses and making it possible to substantially increase the operating frequency, therefore ensuring a substantial advantage in terms of miniaturisation and efficiency. Such an advantage is linked to multiple aspects, among which the following are particularly relevant. The rectifying circuit 10 according to embodiments of the present invention ensures a reduction of the losses in the rectification devices with respect to known circuits, for example diodes or transistors, since the number of devices in series necessary for the rectification with respect to known circuits of a similar type is reduced. Moreover, the rectifying circuit 10 according to embodiments of the present invention allows a reduction of the number of stages of the wireless receiver, since the rectifying circuit 10 also acts as voltage regulator, and if it is necessary, also as multiple output regulator, without introducing additional significant losses. Furthermore, the rectifying circuit 10 makes it possible to reduce the current RMS flowing on the coils for the same output voltage, therefore also reducing the ohmic losses and by skin effect in the coils. Finally, the rectifying circuit 10 does not require the use of ferrites, thus eliminating the losses by hysteresis in them.

Capacitive Transmission

In systems based on the capacitive transmission of energy, the transmission and receiving elements are typically conductive plates, for example metallic, respectively arranged on the primary (or transmission) circuit and on the secondary (or receiving) circuit which are brought together so as to operate as armatures of a condenser.

Figure 13:
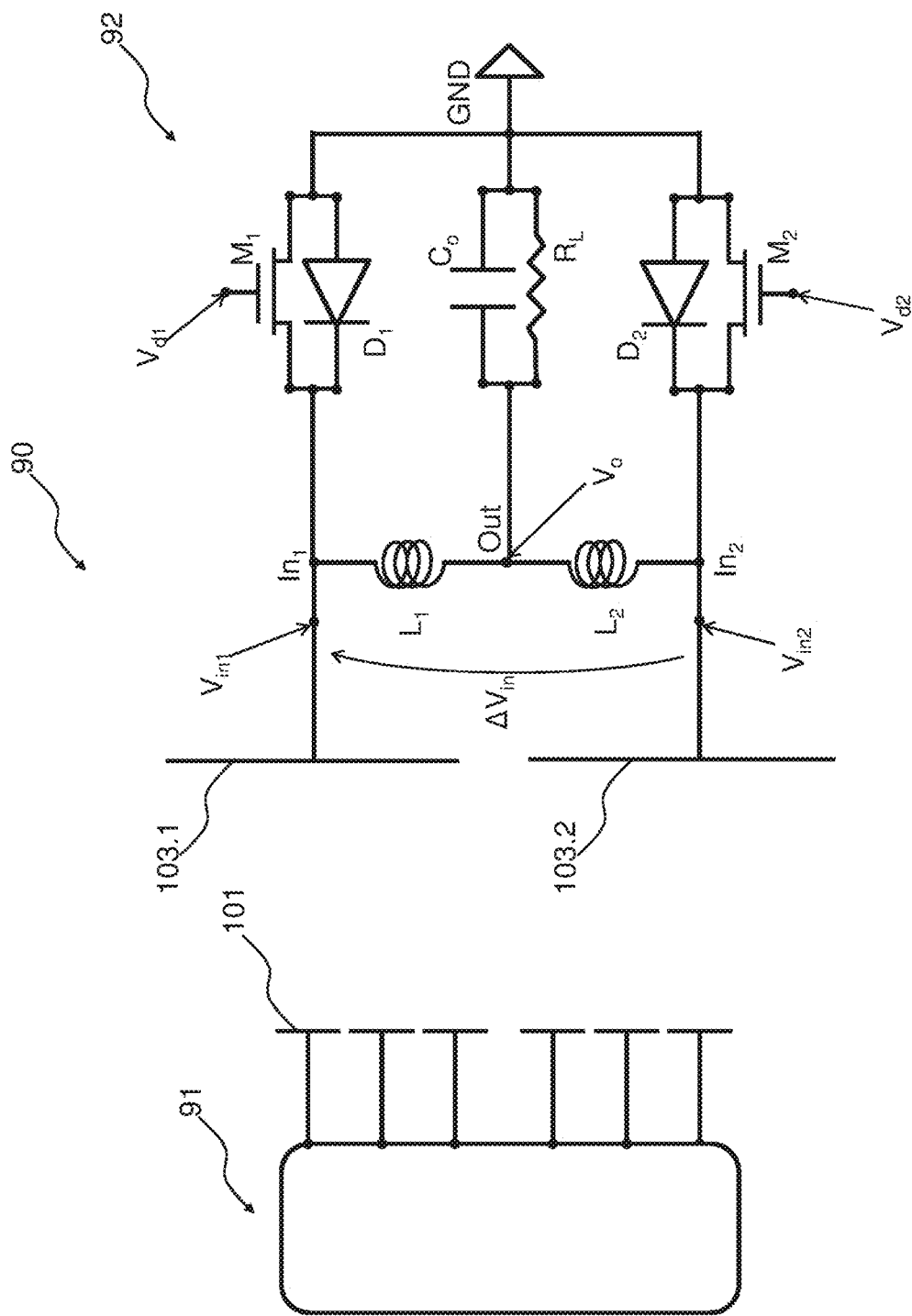
FIG. 13 is a concept circuit diagram of the capacitive energy transfer system according to an embodiment of the present invention.

An advantageous structure for a system 90 based on the capacitive transmission of energy comprises a primary circuit 91 equipped with a plurality of transmission plates 101 that are smaller and in greater number with respect to the receiving plates, for example a single pair of plates 103.1 and 103.2 each connected to a respective input node In1 and In2 of the rectifying circuit 10, comprised in a secondary circuit 92, as illustrated in the example of FIG. 13.

The wireless energy transmission system 90 based on capacitive coupling, in which the transmission circuit 91 comprises a plurality of transmission plates 101, which are excited with a voltage wave in phase if they are coupled with a first receiving plate 103.1, in counter-phase or with a voltage in any case different if they are coupled with a second receiving plate 103.2. In this way, it is possible to make a system 90 independent from the relative positioning between primary circuit 91 and secondary circuit 92, therefore the primary circuit 91 is capable of powering more than one secondary circuit 92 comprised in devices of very different shape and power from one another, in a totally independent manner.

The system 90 can operate at high frequencies by exciting the single transmission plates 101 with high operating frequencies (usually possible since every excitation switch of each armature is particularly small and quick, and such as to distribute the losses among all of the excitation switches), which can be followed by the secondary circuit 92, thanks to the rectifying circuit 10 according to embodiments of the present invention.

Therefore, the proposed system 90 allows a substantial increase in the frequency and efficiency of operation, allowing performance unachievable with any other known wireless energy transmission system of the capacitive type, where the rectifying circuit comprised in the receiving circuit is the bottleneck of the system, i.e. the critical element, in terms of performance in frequency.

Radio Frequency Transmission

In systems based on radio frequency energy transmission, suitable particularly at transmission over long distances, the transmission and receiving elements comprise antennae, single or made as a matrix of antennae.

Figure 14A:
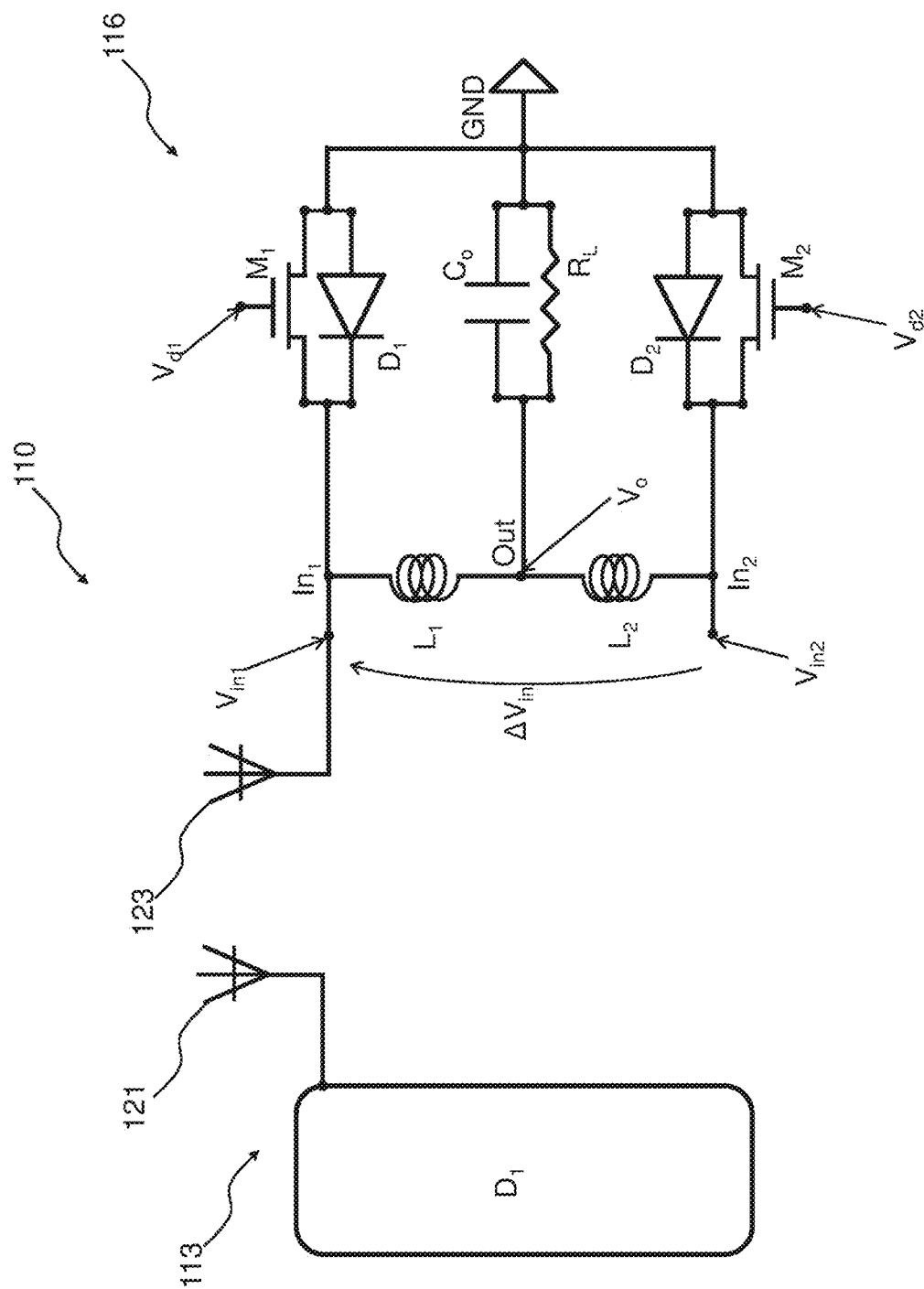
FIG. 14A is a concept circuit diagram of the radio frequency energy transfer system according to an embodiment of the present invention.
Figure 14B:
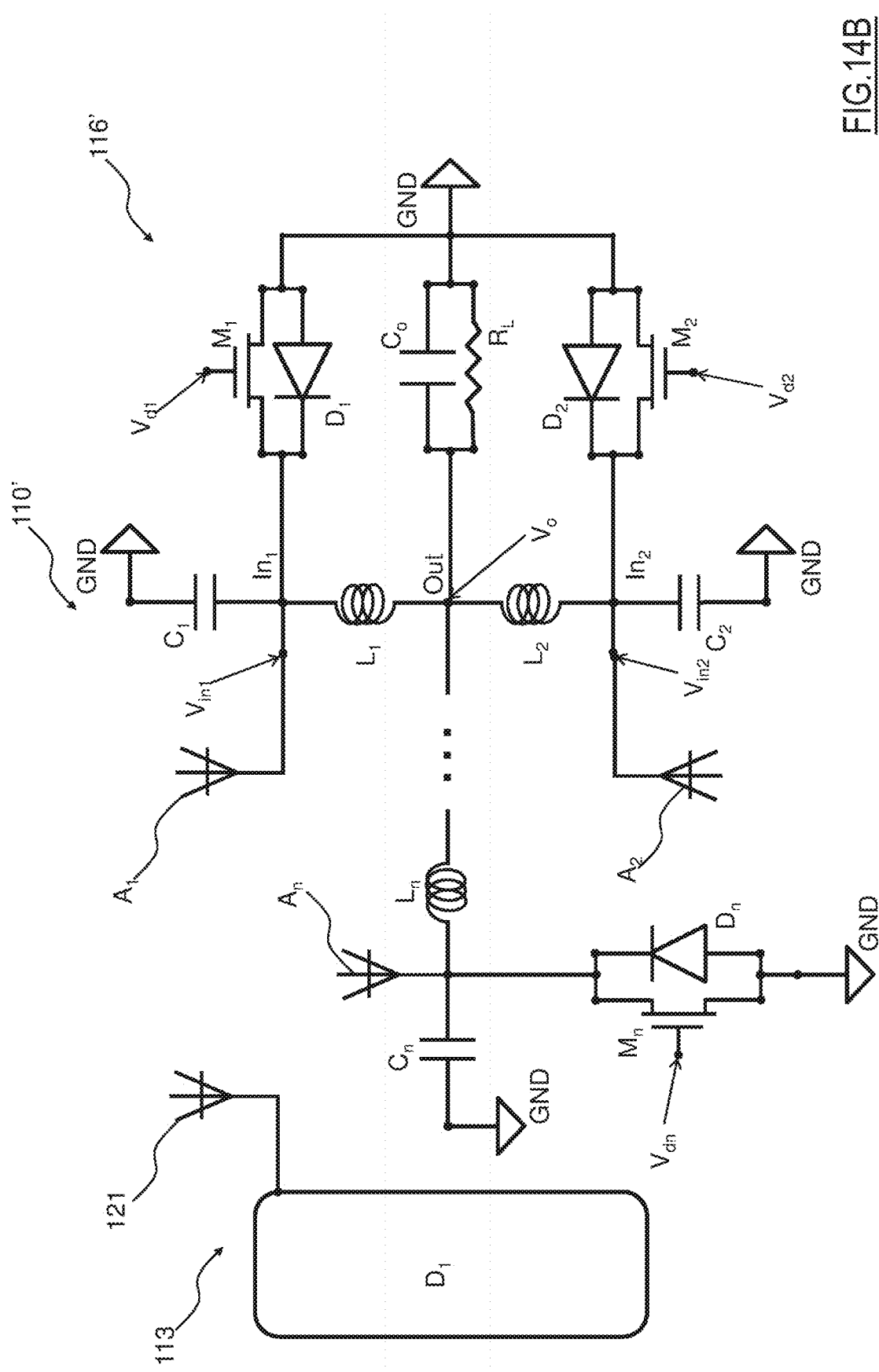
FIG. 14B is a concept circuit diagram of the multi-antenna radio frequency energy transfer system according to an embodiment of the present invention.

As illustrated in FIG. 14, the system 110 comprises a transmission circuit 113 comprising a transmission antenna 121 whereas the receiver circuit 116 comprises the rectifying circuit 10.3 and a receiving antenna 123. Such an antenna 123 is coupled with one of the input nodes, like the node In1 of the rectifying circuit 10.3.

Also in this case, typically the rectifying circuit 10.3 comprised in the receiver circuit 116 is a critical element. Given the high operating frequencies of radio frequency transmission systems, the rectifying circuit 10.3 is particularly useful and effective and makes it possible to improve the performance of the system 110 with respect to known solutions.

An alternative embodiment foresees a modified receiver circuit 116' comprising a plurality of circuit branches, preferably, in parallel to the output branch 40. Each circuit branch comprises an inductor L1-Ln, a transistor M1-Mn, and, moreover, a reactive element like a condenser C1-Cn, and an antenna A1-An. Each inductor L1-Ln and condenser C1-Cn pair is sized to resonate at a different frequency. Moreover, each corresponding antenna A1-An is sized to receive radio frequency signals at the resonance frequency defined by the corresponding inductor L1-Ln and condenser C1-Cn pair. This variant of the receiver circuit 116' thus comprises a matrix, or array, of n circuit branches, each with a respective antenna A1-An tuned to receive a respective frequency or band of frequencies that ensures a wide absorption spectrum of the radio frequency signals intercepted by the receiver circuit. This is particularly useful in the case of use of the receiver circuit 116' in systems based on energy harvesting, since the receiver circuit 116' is suitable for converting energy associated with radio frequency signals with a wide spectrum.

Of course, alternative versions of the power device 70, of the wireless energy transfer systems 80, 90 and of the systems based on the radio frequency transmission of energy 110 can be implemented comprising any one of the rectifying circuits 10.1-10.9 according to embodiments of the present invention.

In conclusion, it is desired to specify that in all the embodiments and in all the circuits described above, with the exception of those in which it was explicitly provided otherwise (for example the one shown in FIG. 12), each of the inductive elements L1 and L2 can be constituted by a magnetically isolated inductor, that is an electrical component (inductor) which is able to generate a magnetic field upon the passage of electric current without being coupled magnetically to any other component.

In any case, in all the embodiments described in the present discussion (including that of FIG. 12), the inductive elements L1 and L2 are not constituted by and/or do not include windings of a transformer.

In other words, none of the embodiments described above provides that the rectifier circuit comprises a transformer.

The invention thus conceived can undergo numerous modifications and variants, all of which are covered by the inventive concept.

For example, the rectifying circuits, and the power devices, the wireless energy transfer systems and the systems based on the radio frequency transmission of energy—comprising one of such rectifying circuits—can be made with discreet components, can be integrated in a System on Chip, or can be made from a combination of discreet and integrated components.

Moreover, all of the details can be replaced by other technically equivalent elements.

In practice, the materials used, as well as the contingent shapes and sizes, can be whatever according to the requirements without for this reason departing from the scope of protection of the following claims.

The invention claimed is:

1. A rectifying circuit comprising an output node, a reference node, a first circuit branch and a second circuit branch in parallel between the output node and the reference node, each circuit branch comprising an inductive element in series with an electric current controlling element and an input node arranged between the inductive element and the electric current controlling element,
    wherein an input voltage that is variable over time is applied between the input nodes during the operation of the rectifying circuit,
    wherein each inductive element does not comprise any winding of a transformer,
    wherein each electric current controlling element comprises a transistor having a first conduction terminal connected to the reference node and a second conduction terminal connected to the respective input node, and a diode having the anode connected to the reference node and the cathode connected to the respective input node, the transistor being in parallel to the diode.

2. The rectifying circuit according to claim 1, wherein each electric current controlling element comprises a further transistor, the further transistor being connected in anti-series to the respective transistor.

3. The rectifying circuit according to claim 1, further comprising a pair of input terminals for receiving the input voltage, and wherein each circuit branch further comprises a decoupling element connected to the input node and to a respective input terminal.

4. The rectifying circuit according to claim 1, wherein each inductive element is a magnetically insulated inductor.

5. A power device comprising the rectifying circuit according to claim 1.

6. An inductive receiver circuit comprising the rectifying circuit according to claim 1, wherein each inductive element comprises a respective receiving coil.

7. A capacitive receiver circuit comprising the rectifying circuit according to claim 1, wherein each of the input nodes is coupled with a respective conductive receiving plate.

8. The radio frequency receiver circuit according to claim 1, wherein each of the inductive elements has a first terminal connected to the output node and a second terminal connected to the respective input node, and wherein each of the electric current controlling element has a first terminal connected to the reference node and a second terminal connected to the respective input node.

9. A radio frequency receiver circuit comprising the rectifying circuit according to claim 1, wherein at least one of the input nodes is coupled with an antenna.

10. The radio frequency receiver circuit according to claim 9, further comprising at least one additional circuit branch coupled with a respective antenna, each branch comprising a respective inductor and condenser pair resonating at a respective frequency.

11. The rectifying circuit according to claim 1, wherein each transistor is selected from a silicon field-effect transistor preferably of type n or alternatively of type p, a field-effect transistor preferably with high electron mobility HEMT, preferably GaN, GaAs, AlGaN, AlGaAs, InGaN, InGaAs, SiC, a bipolar transistor, an insulated gate bipolar transistor, or IGBT.

12. The rectifying circuit according to claim 11, wherein each transistor is a field-effect transistor, a source terminal of the field-effect transistor being connected to the reference node and a drain terminal of the field-effect transistor being connected to the respective input node.

13. The rectifying circuit according to claim 1, wherein a capacitive element and a load element are coupled in parallel between the output node and the reference node of the rectifying circuit.

14. The rectifying circuit according to claim 13 provides for a further current controlling element, comprising a transistor, connected in series to the capacitive element and to the load element in parallel with one another, the series of the transistor, and of the parallel between the capacitive element and the load element being connected between the output node and the reference node.

15. The rectifying circuit according to claim 1, further comprising a capacitive element connected to the input nodes of the circuit branches.

16. The rectifying circuit according to claim 13, wherein the capacitive element is sized to define a predetermined resonance frequency in combination with the inductive elements.

17. The rectifying circuit according to claim 15, wherein each decoupling element comprises a respective capacitive element, and wherein the capacitive elements are sized to define a predetermined resonance frequency in combination with the inductive elements.

18. The rectifying circuit according to claim 1, further comprising a control module, and wherein each transistor further comprises a control terminal connected to the control module for receiving a respective pilot signal, the control module comprising:
  a measuring unit suitable for measuring at least one value from electric voltage and electric current at least one from a node of the circuit and an element of the rectifying circuit, and a pilot unit suitable for generating a pilot signal based on the
  at least one value measured for each transistor and supplying the pilot signal to the control terminal of the respective transistor.

19. The rectifying circuit according to claim 18, wherein the measuring unit is configured to measure at least one from:
  a voltage at the input node of the first circuit branch;
  an electric current flowing through the electric current controlling element of the first circuit branch;
  a power absorbed by the electric current controlling element of the first circuit branch;
  a voltage at the input node (In2) of the second circuit branch;
an electric current flowing through the electric current controlling element of the second circuit branch;
  a power absorbed by the electric current controlling element of the second circuit branch, and a voltage at the output node (Out) of the rectifying circuit.

20. The rectifying circuit according to claim 19, wherein the measuring unit is configured to measure at least one from:
  an electric current flowing through the load element; an electric current flowing through the capacitive element, and a power absorbed by the load element.

21. The rectifying circuit according to claim 18, wherein the control module further comprises a powering unit connected to the output node, to the pilot unit and to the measuring unit, the powering unit absorbing energy from the output node and supplying it to the pilot unit and to the measuring unit for the operation thereof.

22. The rectifying circuit to claim 18, wherein the control module further comprises a powering unit connected to an input node through a diode connected to the input node and to the powering unit and a condenser connected to the powering unit and to the reference node, the powering unit also being connected to the pilot unit and to the measuring unit, the powering unit absorbing energy from the input node and supplying it to the pilot unit and to the measuring unit for the operation thereof.

23. The rectifying circuit according to claim 21, wherein the powering unit comprises a low-dropout regulator, or LDO regulator.

24. The rectifying circuit according to claim 18, wherein the pilot unit comprises:
  a delay estimation block suitable for estimating at least one delay associated with a switching of the pilot signal supplied to the respective transistor and a corresponding response of the rectifying circuit based on the at least one measured value, and a logic block suitable for generating the pilot signal for each transistor based on the identified delay.

25. The rectifying circuit according to claim 24, wherein the pilot block is suitable for generating the pilot signal for each transistor based on the at least one measured value and the identified delay.

26. The rectifying circuit according to claim 24, wherein the delay estimation block is configured to estimate an activation delay associated with a first switching of the pilot signal, suitable for activating the respective transistor, and the corresponding response of the circuit to it.

27. The rectifying circuit according to claim 26, wherein the delay estimation block is configured to estimate a switching-off delay associated with a second switching of the pilot signal, suitable for switching off the respective transistor, and the corresponding response of the rectifying circuit to it.

28. The rectifying circuit according to claim 24, wherein the logic block is configured to generate at least one predetermined first pilot test signal and second pilot test signal and supplying them to the transistor of the first circuit branch and to the transistor of the second circuit branch, respectively, and wherein the delay estimation block is configured to estimate a delay in the response of the rectifying circuit to the pilot test signals.

29. The rectifying circuit according to claim 28, wherein the logic block is configured to generate the pilot test signals upon an activation of the control module.

30. The rectifying circuit according to claim 24, wherein the logic block is configured to make the generation of the pilot signals happen earlier so as to compensate for the delay identified by the delay estimation block.

31. The rectifying circuit according to claim 30, wherein the logic block is configured to compensate for the delay so as to minimize a power absorbed by each electric current controlling element.

32. The rectifying circuit according to claim 31, wherein the logic block is configured to compensate for the delay so as to maximize a power absorbed by the load element.

33. The rectifying circuit according to claim 18, wherein the input voltage is a voltage that is variable over time comprising periodically alternating opposite half-waves, each circuit branch being suitable for converting a respective halfwave of the input voltage into a continuous output voltage, and wherein the pilot unit is configured to generate the pilot signal for each transistor so as to selectively inhibit the conversion of the respective half-wave of the input voltage.

* * * * *